(12) United States Patent
Tasaki et al.

(10) Patent No.: US 11,358,101 B2
(45) Date of Patent: Jun. 14, 2022

(54) SPIRAL-WOUND GAS SEPARATION MEMBRANE ELEMENT, GAS SEPARATION MEMBRANE MODULE, AND GAS SEPARATION APPARATUS

(71) Applicant: SUMITOMO CHEMICAL COMPANY, LIMITED, Tokyo (JP)

(72) Inventors: Tsutomu Tasaki, Osaka (JP); Kazuya Inamoto, Niihama (JP); Cui Liang, Osaka (JP); Shohei Kasahara, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 179 days.

(21) Appl. No.: 16/603,056

(22) PCT Filed: Mar. 12, 2018

(86) PCT No.: PCT/JP2018/009434
§ 371 (c)(1),
(2) Date: Oct. 4, 2019

(87) PCT Pub. No.: WO2018/186109
PCT Pub. Date: Oct. 11, 2018

(65) Prior Publication Data
US 2020/0047129 A1 Feb. 13, 2020

(30) Foreign Application Priority Data

Apr. 7, 2017 (JP) .............................. JP2017-077025

(51) Int. Cl.
*B01D 63/10* (2006.01)
*C08J 7/04* (2020.01)
(Continued)

(52) U.S. Cl.
CPC ........... *B01D 63/10* (2013.01); *B01D 53/228* (2013.01); *B01D 69/12* (2013.01); *B01D 69/142* (2013.01);
(Continued)

(58) Field of Classification Search
None
See application file for complete search history.

(56) References Cited

U.S. PATENT DOCUMENTS

| 5,147,541 A | 9/1992 | McDermott, Jr. et al. |
| 6,352,641 B1 * | 3/2002 | Schmidt ................. B01D 63/10 210/321.74 |

(Continued)

FOREIGN PATENT DOCUMENTS

| CN | 105431220 A | 3/2016 |
| CN | 105451864 A | 3/2016 |

(Continued)

OTHER PUBLICATIONS

Japanese Notice of Grounds of Rejection issued in corresponding Japanese Patent Application No. 2017-077025, dated Feb. 2, 2021, with English translation.

(Continued)

*Primary Examiner* — Jason M Greene
(74) *Attorney, Agent, or Firm* — McDermott Will & Emery LLP

(57) ABSTRACT

Provided are a spiral-wound gas separation membrane element, a manufacturing method therefor, a gas separation membrane module and a gas separation apparatus that include the element. The element includes a laminated body wound around a perforated central tube and including a separation membrane-flow channel member composite body. The composite body includes a gas separation membrane including a first porous layer and a hydrophilic resin (Continued)

composition layer. The gas separation membrane is folded with the first porous layer being located outside the hydrophilic resin composition layer. The composite body also includes a flow channel member that forms a gas flow channel, the flow channel member being sandwiched in the folded gas separation membrane. The flow channel member is provided with a first cover that covers one end portion of four end portions. The first cover is located closest to a turn-back part of the folded gas separation membrane.

13 Claims, 8 Drawing Sheets

(51) Int. Cl.
*B01D 53/22* (2006.01)
*B01D 69/12* (2006.01)
*B01D 69/14* (2006.01)
*C08J 5/18* (2006.01)

(52) U.S. Cl.
CPC .............. *C08J 5/18* (2013.01); *C08J 7/0427* (2020.01); *B01D 2053/221* (2013.01); *B01D 2313/08* (2013.01); *C08J 2327/18* (2013.01); *C08J 2433/02* (2013.01); *C08J 2481/04* (2013.01)

(56) References Cited

U.S. PATENT DOCUMENTS

| | | | |
|---|---|---|---|
| 7,875,177 B2 | 1/2011 | Haynes et al. | |
| 2004/0099598 A1* | 5/2004 | Cheng | B01D 63/10 210/321.85 |
| 2004/0124134 A1 | 7/2004 | Irie et al. | |
| 2009/0065426 A1 | 3/2009 | Ishii et al. | |
| 2010/0140161 A1 | 6/2010 | Haynes et al. | |
| 2016/0136572 A1* | 5/2016 | Narita | B01D 53/228 96/13 |
| 2016/0136581 A1 | 5/2016 | Sawada et al. | |
| 2016/0151740 A1* | 6/2016 | Ouchi | B01D 63/10 422/212 |
| 2016/0236156 A1 | 8/2016 | Rozenbaoum et al. | |

FOREIGN PATENT DOCUMENTS

| | | |
|---|---|---|
| DE | 19747004 A1 | 4/1999 |
| JP | 60-148004 U | 10/1985 |
| JP | 04-267932 A | 9/1992 |
| JP | 09-038410 A | 2/1997 |
| JP | 10-137558 A | 5/1998 |
| JP | 2001-062262 A | 3/2001 |
| JP | 2001-198442 A | 7/2001 |
| JP | 2001-520930 A | 11/2001 |
| JP | 2005-224718 A | 8/2005 |
| JP | 2006-116419 A | 5/2006 |
| JP | 2007-275871 A | 10/2007 |
| JP | 2015-057273 A | 3/2015 |
| JP | 2016-137462 A | 8/2016 |
| WO | 2010/68368 A1 | 6/2010 |
| WO | 2016/121436 A1 | 8/2016 |

OTHER PUBLICATIONS

Extended European Search Report issue in corresponding European Patent Application No. 18781629.3-1104, dated Jan. 14, 2021.
International Search Report issued in corresponding International Patent Application No. PCT/JP2018/009434, dated May 29, 2018, with English translation.
Japanese Notice of Grounds of Rejection issued in corresponding Japanese Patent Application No. 2017-077025, dated Aug. 3, 2021, with English translation.
Chinese Office Action issued in corresponding Chinese Patent Application No. 201880022634.3, dated May 17, 2021, with English translation.

* cited by examiner (a)

(b)

SPIRAL-WOUND GAS SEPARATION MEMBRANE ELEMENT, GAS SEPARATION MEMBRANE MODULE, AND GAS SEPARATION APPARATUS

CROSS REFERENCE TO RELATED APPLICATIONS

This application is the U.S. National Phase under 35 U.S.C. § 371 of International Application No. PCT/JP2018/009434 filed on Mar. 12, 2018, which claims the benefit of Japanese Application No. 2017-077025, filed on Apr. 7, 2017, the entire contents of each are hereby incorporated by reference.

TECHNICAL FIELD

The present invention relates to a spiral-wound gas separation membrane element, a method for manufacturing the same, a gas separation membrane module, and a gas separation apparatus.

BACKGROUND ART

Gas membrane separation processes have received attention in recent years because of their capability of achieving energy conservation when used as a process for separating $CO_2$ from various gases such as natural or exhaust gases as well as synthetic gases that are synthesized in plants for producing hydrogen, urea or others.

As a gas separation membrane element including a separation membrane such as a gas separation membrane, for example, a spiral-wound gas separation membrane element including a wound body is known. The wound body is obtained by winding a laminated body including a separation membrane and a flow channel member forming a gas flow channel around a central tube having a plurality of perforations.

As the laminated body, there is known a laminated body including a composite body, which also referred to as a "membrane leaf", having a structure in which a gas separation membrane is folded and a flow channel member forming a gas flow channel is sandwiched in the folded gas separation membrane (for example, Patent Literature 1). Herein, a composite body in which the gas separation membrane is folded and the flow channel member is sandwiched in the folded gas separation membrane is also referred to as a "separation membrane-flow channel member composite body".

CITATION LIST

Patent Literature

PTL 1: Japanese Patent Laying-Open No. 2006-116419

SUMMARY OF INVENTION

Technical Problem

It is an object of the present invention to provide a spiral-wound gas separation membrane element that can suppress a decrease in separation efficiency (separation selectivity), a method for manufacturing the same, and a gas separation membrane module and a gas separation apparatus that include the spiral-wound gas separation membrane element.

Solution to Problem

The present invention provides the following spiral-wound gas separation membrane element, gas separation membrane module, gas separation apparatus, separation membrane-flow channel member composite body, and a method for manufacturing a spiral-wound gas separation membrane element.

[1] A spiral-wound gas separation membrane element including a perforated central tube and a laminated body wound around the central tube, wherein
  the laminated body includes a separation membrane-flow channel member composite body,
  the separation membrane-flow channel member composite body includes
    a gas separation membrane, and
    a flow channel member that forms a gas flow channel,
  the gas separation membrane includes
    a first porous layer, and
    a hydrophilic resin composition layer,
  the flow channel member
    has four end portions, and
    is provided with a first cover that covers one end portion of the four end portions,
  the gas separation membrane is folded with the first porous layer being located outside the hydrophilic resin composition layer,
  the flow channel member is sandwiched in the folded gas separation membrane, and
  the first cover is located closest to a turn-back part of the folded gas separation membrane.

[2] The spiral-wound gas separation membrane element according to [1], wherein the first cover includes a film disposed to cover the one end portion.

[3] The spiral-wound gas separation membrane element according to [1] or [2], wherein the flow channel member includes a layer formed of a non-woven fabric, a woven fabric, or a net including at least one material selected from the group consisting of resin, metal, and glass.

[4] The spiral-wound gas separation membrane element according to any of [1] to [3], wherein the gas separation membrane includes a penetration region into which a resin or a cured material of a resin is penetrated and which is disposed on an outer side of the turn-back part.

[5] The spiral-wound gas separation membrane element according to [4], wherein the penetration region includes a cured material of an epoxy-based resin.

[6] The spiral-wound gas separation membrane element according to [4] or [5], wherein the gas separation membrane further includes a second cover disposed on the penetration region.

[7] The spiral-wound gas separation membrane element according to [6], wherein the second cover includes a film disposed to cover the penetration region.

[8] The spiral-wound gas separation membrane element according to any of [1] to [7], wherein the hydrophilic resin composition layer includes a hydrophilic resin and an acid gas carrier capable of reversibly reacting with an acid gas.

[9] A gas separation membrane module including, in a housing, at least one spiral-wound gas separation membrane element as recited in any of [1] to [8].

[10] A gas separation apparatus including at least one gas separation membrane module as recited in [9].

[11] A separation membrane-flow channel member composite body including a gas separation membrane, and a flow channel member that forms a gas flow channel, wherein the gas separation membrane includes
a first porous layer, and
a hydrophilic resin composition layer,
the flow channel member
has four end portions, and
is provided with a first cover that covers one end portion of the four end portions,
the flow channel member is sandwiched in the gas separation membrane which is folded, and
the first cover is located closest to a turn-back part of the folded gas separation membrane.

[12] A method for manufacturing a spiral-wound gas separation membrane element including a perforated central tube and a laminated body wound around the central tube, wherein
the laminated body includes a separation membrane-flow channel member composite body,
the separation membrane-flow channel member composite body includes
a gas separation membrane, and
a flow channel member that forms a gas flow channel,
the gas separation membrane includes
a first porous layer, and
a hydrophilic resin composition layer,
the flow channel member
has four end portions, and
is provided with a first cover that covers one end portion of the four end portions,
the gas separation membrane is folded with the first porous layer being located outside the hydrophilic resin composition layer,
the flow channel member is sandwiched in the folded gas separation membrane, and
the first cover is located closest to a turn-back part of the folded gas separation membrane, and wherein
the method includes:
a step of providing the first cover on the flow channel member; and
a step of producing the separation membrane-flow channel member composite body by disposing the first cover of the flow channel member closest to the turn-back part.

[13] The method according to [12], wherein the gas separation membrane further includes a penetration region into which a resin or a cured material of a resin is penetrated and which is disposed on an outer side of the turn-back part, and
the method further includes a step of forming the penetration region.

[14] The method according to [13], wherein the method further includes a step of providing a second cover on the penetration region.

Advantageous Effect of Invention

There can be provided a spiral-wound gas separation membrane element that can suppress a decrease in separation efficiency (separation selectivity), a method for manufacturing the same, and a gas separation membrane module and a gas separation apparatus that include the spiral-wound gas separation membrane element.

BRIEF DESCRIPTION OF DRAWINGS

FIG. 7 shows the developed spiral-wound gas separation membrane element according to the present invention as an example, in which FIGS. 7(a) and 7(b) are respectively a schematic cross-sectional view and schematic plan view thereof.

DESCRIPTION OF EMBODIMENTS

Hereinafter, embodiments of the present invention will be described in detail. However, the present invention is not limited to the embodiments, and various modifications can be made within the described scope. Embodiments obtained by combining technical means disclosed in different embodiments are also encompassed within the technical scope of the present invention.

<Spiral-Wound Gas Separation Membrane Element>

A spiral-wound gas separation membrane element (hereinafter, sometimes referred to simply as a "gas separation membrane element") according to the present invention includes a perforated central tube and a wound body wound around the central tube. The wound body is composed of a laminated body including a flow channel member forming a feed-side gas flow channel, a gas separation membrane including a hydrophilic resin composition layer, and a flow channel member forming a permeate-side gas flow channel being laminated. In one example of the gas separation membrane element according to the present invention, the laminated body includes a separation membrane-flow channel member composite body (membrane leaf) composed of the gas separation membrane and the flow channel member forming a feed-side gas flow channel.

Hereinafter, embodiments of the gas separation membrane element according to the present invention will be described in detail with reference to the drawings.

Figure 1:
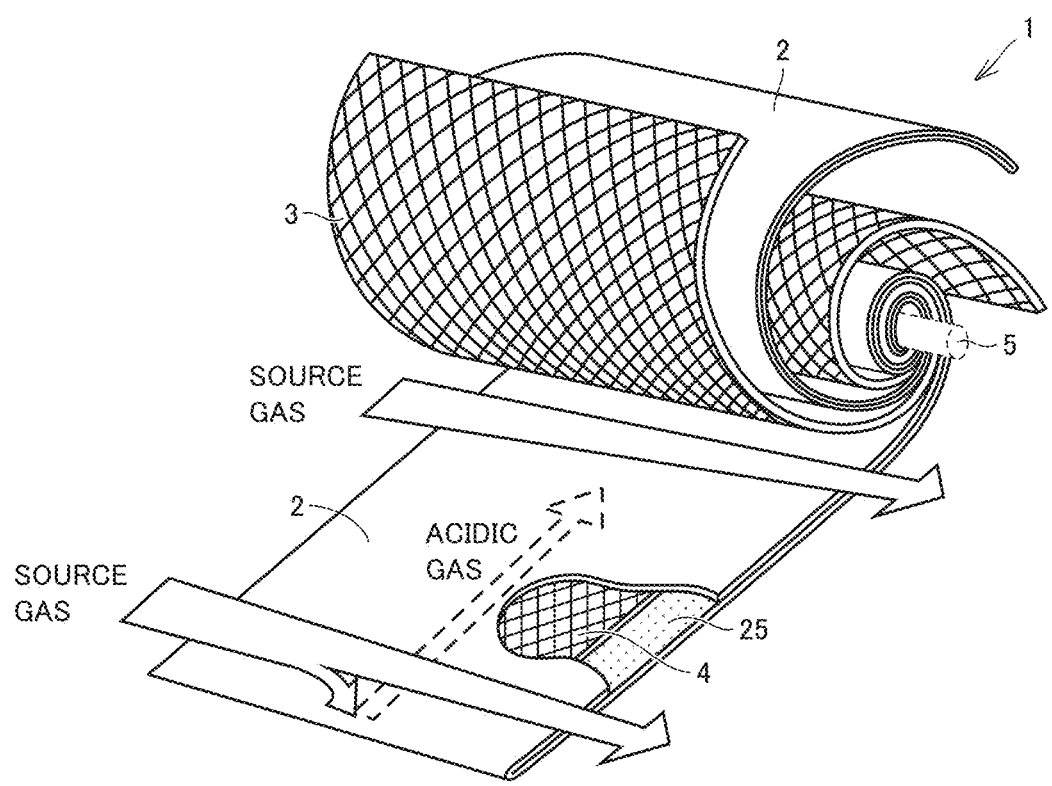
FIG. 1 is a schematic perspective view showing an example of a developed spiral-wound gas separation membrane element according to the present invention, in which a partially cutaway portion is provided.
Figure 2:
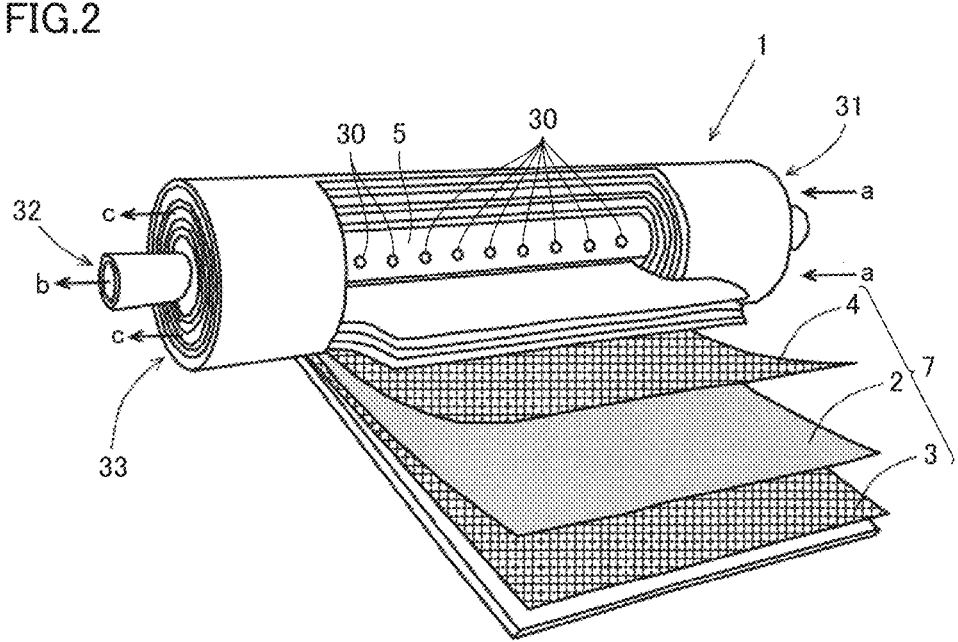
FIG. 2 is a schematic perspective view showing an example of spiral-wound gas separation membrane element according to the present invention, in which a partially developed portion is provided.
Figure 3:
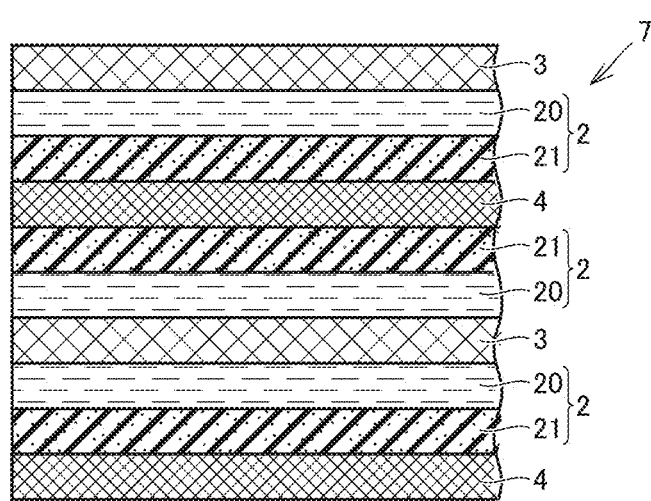
FIG. 3 is a schematic cross-sectional view illustratively showing a part of a wound body (laminated body) constituting the spiral-wound gas separation membrane element according to the present invention.

FIG. 1 is a schematic perspective view showing a developed gas separation membrane element 1 as an example of the gas separation membrane element according to the present invention, in which a partially cutaway portion is provided. FIG. 2 is a schematic perspective view showing gas separation membrane element 1 as an example of the gas separation membrane element according to the present invention, in which a partially developed portion is provided. FIG. 3 is a schematic cross-sectional view illustratively showing a part of a wound body (laminated body)

constituting gas separation membrane element 1 as an example of the gas separation membrane element according to the present invention.

The layer structures of the gas separation membrane element and wound body (laminated body) shown in FIGS. 1 to 3 are exemplified, and the present invention is not limited to these examples.

As shown in FIGS. 1 and 2, gas separation membrane element 1 includes at least one gas separation membrane 2, at least one flow channel member 3 forming a feed-side gas flow channel, and at least one flow channel member 4 forming a permeate-side gas flow channel A laminated body 7 is obtained by laminating them. Gas separation membrane element 1 may include a wound body obtained by winding laminated body 7 around a central tube 5. The wound body may have any shape such as a cylindrical shape or a rectangular cylindrical shape. However, the wound body preferably has a cylindrical shape since the wound body is enclosed in a cylindrical housing (container).

Gas separation membrane element 1 may further include a fixing member (not shown) such as an outer peripheral tape or an anti-telescope device (ATD), in order to prevent the wound body from rewinding or the collapse of winding. In order to secure strength against a load due to internal pressure and external pressure on gas separation membrane element 1, an outer wrap (reinforcing layer) may be provided on the outermost periphery of the wound body. The outer peripheral tape is wound around the outer periphery of the wound body, so that it is possible to suppress the rewinding of the wound body. The anti-telescope device is attached to each end portion of the wound body, and it is possible to suppress the occurrence of a winding collapse (telescope) phenomenon in the wound body during the use of gas separation membrane element 1. As the outer wrap (reinforcing layer), a reinforcing material such as a fiber-reinforced resin made of glass fibers impregnated with an epoxy resin may be used. It is preferable that the reinforcing material is wound around the outermost periphery of the wound body, and the epoxy resin is then cured.

[Wound Body]

As shown in FIG. 3, the wound body forming gas separation membrane element 1 may be composed of, for example, laminated body 7 in which flow channel member 4 forming a permeate-side gas flow channel, gas separation membrane 2, flow channel member 3 forming a feed-side gas flow channel, and gas separation membrane 2 are repeatedly laminated in this order. Gas separation membrane 2 includes a first porous layer 21 formed of a porous body and a hydrophilic resin composition layer 20, as described later.

Flow channel member 3 forming a feed-side gas flow channel is a member to which a source gas is fed, and the source gas is fed to gas separation membrane 2 through the member.

Gas separation membrane 2 includes first porous layer 21, and hydrophilic resin composition layer 20 that separates a specific gas contained in the source gas fed from flow channel member 3 forming a feed-side gas flow channel and allows the specific gas to permeate therethrough. First porous layer 21 is provided for the purpose of supporting hydrophilic resin composition layer 20 upon the separation of a specific gas from the source gas using gas separation membrane 2, and is usually provided adjacent to hydrophilic resin composition layer 20.

Flow channel member 4 forming a permeate-side gas flow channel is a member through which a permeate gas that has permeated through gas separation membrane 2 (containing at least part of the source gas fed to gas separation membrane 2) flows, and guides the permeate gas to central tube 5.

Central tube 5 collects the permeate gas flowing through flow channel member 4 forming a permeate-side gas flow channel.

Gas separation membrane 2 constituting laminated body 7 may include at least one second porous layer (protective layer) formed of a porous body. The second porous layer is disposed, for example, between gas separation membrane 2 and flow channel member 3 forming a feed-side gas flow channel Laminated body 7 may include at least one third porous layer (reinforcement support layer) formed of a porous body. The third porous layer is disposed, for example, between gas separation membrane 2 and flow channel member 4 forming a permeate-side gas flow channel

[Separation Membrane-Flow Channel Member Composite Body]

Laminated body 7 constituting the wound body includes a separation membrane-flow channel member composite body (membrane leaf). The separation membrane-flow channel member composite body is composed of gas separation membrane 2 folded in two and a flow channel member sandwiched in the folded gas separation membrane 2. The flow channel member sandwiched in the folded gas separation membrane 2 is, for example, flow channel member 3 forming a feed-side gas flow channel, but it may also be flow channel member 4 forming a permeate-side gas flow channel. When the flow channel member sandwiched in the folded gas separation membrane 2 is flow channel member 3 forming a feed-side gas flow channel, gas separation membrane 2 is folded such that first porous layer 21 is located on the outside, that is, first porous layer 21 is located outside hydrophilic resin composition layer 20. The size of the folded gas separation membrane 2 may be, for example, about 0.5 m to 1.5 m×0.5 m to 1.5 m.

Depending on the type of the gas separation membrane element, or the like, gas separation membrane 2 may be folded such that hydrophilic resin composition layer 20 is located outside first porous layer 21.

(Gas Separation Membrane 2)

Gas separation membrane 2 constituting the separation membrane-flow channel member composite body includes first porous layer 21 and hydrophilic resin composition layer 20. In order to achieve the separation and permeation of a specific gas contained in the source gas flowing through flow channel member 3 forming a feed-side gas flow channel, hydrophilic resin composition layer 20 has permselectivity for the specific gas. Gas separation membrane 2 can have permselectivity for a specific gas based on a solution-diffusion mechanism utilizing the difference between the solubility of gas molecules into the membrane and the diffusivity of the gas molecules in the membrane. Gas separation membrane 2 preferably has permselectivity based on, in addition to the solution-diffusion mechanism, a facilitated transport mechanism by which a reaction product of a specific gas and a carrier is formed to promote the permeation of the specific gas. As a result, higher permselectivity for a specific gas can be realized. The permselectivity based on the facilitated transport mechanism can be imparted by adding a carrier capable of reversibly reacting with a specific gas to hydrophilic resin composition layer 20 included in gas separation membrane 2.

The source gas means a gas fed to gas separation membrane element 1. When the specific gas for which hydrophilic resin composition layer 20 of gas separation membrane 2 exhibits permselectivity is an acidic gas, the source gas contains at least the acidic gas. The above-mentioned permeate gas means a gas that has permeated through gas separation membrane 2 of gas separation membrane element 1, and contains at least part of the acidic gas. Here, the acidic gas means a gas exhibiting acidity such as carbon dioxide ($CO_2$), hydrogen sulfide ($H_2S$), carbonyl sulfide, sulfur oxide ($SO_x$), nitrogen oxide ($NO_x$), or hydrogen halide such as hydrogen chloride. When the permeate gas is refed to gas separation membrane element 1, the permeate gas may be part of the source gas fed to the gas separation membrane element.

The following reaction formula (1) shows a reaction of $CO_2$ with a $CO_2$ carrier when the specific gas for which hydrophilic resin composition layer 20 of gas separation membrane 2 exhibits permselectivity is $CO_2$ as an acidic gas and cesium carbonate ($Cs_2CO_3$) is used as a carrier ($CO_2$ carrier). The symbol "↔" in the reaction formula (1) indicates that this reaction is a reversible reaction.

$$CO_2 + Cs_2CO_3 + H_2O \leftrightarrow 2CsHCO_3 \qquad (1)$$

As shown by the above reaction formula (1), water is necessary for the reversible reaction of $CO_2$ and the $CO_2$ carrier.

Hydrophilic resin composition layer 20 exhibits permselectivity for a specific gas in gas separation membrane 2, and has a function of causing the specific gas to permeate therethrough. As described above, when the specific gas is $CO_2$ as an acidic gas, and the $CO_2$ carrier is used, it is preferable that hydrophilic resin composition layer 20 is a gel-like thin membrane that contains a hydrophilic resin composition containing a $CO_2$ carrier capable of reversibly reacting with $CO_2$ in the source gas, and a hydrophilic resin serving as a medium holding the $CO_2$ carrier and water.

The thickness of hydrophilic resin composition layer 20 may be appropriately selected depending on separation performance required for gas separation membrane 2, and it is usually preferably within a range of 0.1 μm to 600 μm, more preferably within a range of 0.5 μm to 400 μm, and particularly preferably within a range of 1 μm to 200 μm.

As the hydrophilic resin contained in hydrophilic resin composition layer 20, for example, when the specific gas for which gas separation membrane 2 exhibits permselectivity is $CO_2$ as an acidic gas, as shown in the above reaction formula (1), water is required for the reversible reaction between $CO_2$ and a $CO_2$ carrier, so that it is preferable that the hydrophilic resin has a hydrophilic group such as a hydroxyl group or an ion exchange group. It is more preferable that the hydrophilic resin contains a crosslinked hydrophilic resin in which molecular chains are crosslinked to form a network structure, exhibiting high water-holding properties. Since a pressure difference is applied as a driving force for the permeation of a specific gas through gas separation membrane 2, it is preferable to use a hydrophilic resin containing the crosslinked hydrophilic resin also from the viewpoint of pressure resistance strength required for gas separation membrane 2.

It is preferable that the polymer forming the hydrophilic resin has, for example, a structural unit derived from an alkyl acrylate, an alkyl ester methacrylate, a vinyl ester of a fatty acid, or a derivative thereof. Examples of such polymers having hydrophilicity include polymers obtained by polymerizing monomers such as acrylic acid, itaconic acid, crotonic acid, methacrylic acid, and vinyl acetate. Specific examples thereof include resins having a carboxyl group as an ion exchange group, such as a polyacrylic acid resin, a polyitaconic acid resin, a polycrotonic acid resin, and a polymethacrylic acid resin; a polyvinyl alcohol resin having a hydroxy group; and copolymers thereof such as an acrylic acid-vinyl alcohol copolymer resin, an acrylic acid-methacrylic acid copolymer resin, an acrylic acid-methyl methacrylate copolymer resin, and a methacrylic acid-methyl methacrylate copolymer resin. Among them, a polyacrylic acid resin that is a polymer of acrylic acid, a polymethacrylic acid resin that is a polymer of methacrylic acid, a polyvinyl alcohol resin obtained by hydrolyzing a polymer of vinyl acetate, an acrylate-vinyl alcohol copolymer resin obtained by saponifying a copolymer of methyl acrylate and vinyl acetate, and an acrylic acid-methacrylic acid copolymer resin that is a copolymer of acrylic acid and methacrylic acid are more preferable, and polyacrylic acid and an acrylate-vinyl alcohol copolymer resin are still more preferable.

The crosslinked hydrophilic resin may be prepared by causing a polymer exhibiting hydrophilicity to react with a crosslinking agent, or may also be prepared by copolymerizing a monomer that serves as the raw material of the polymer exhibiting hydrophilicity with a crosslinkable monomer. The crosslinking agent or the crosslinkable monomer is not particularly limited, and a conventionally known crosslinking agent or crosslinkable monomer can be used.

Examples of the crosslinking agent include conventionally known crosslinking agents such as an epoxy crosslinking agent, polyvalent glycidyl ether, a polyhydric alcohol, a polyvalent isocyanate, a polyvalent aziridine, a haloepoxy compound, a polyvalent aldehyde, a polyvalent amine, an organometallic crosslinking agent, and a metallic crosslinking agent. Examples of the crosslinkable monomer include conventionally known crosslinkable monomers such as divinylbenzene, N,N'-methylenebisacrylamide, trimethylolpropane triallylether, and pentaerythritol tetraallylether. As a crosslinking method, it is possible to use conventionally known techniques such as thermal crosslinking, ultraviolet crosslinking, electron beam crosslinking, radiation crosslinking, and photo-crosslinking as well as methods described in Japanese Patent Laying-Open Nos. 2003-268009 and H07-88171.

A carrier is a substance capable of reversibly reacting with a specific gas in a source gas. By adding the carrier, the function of hydrophilic resin composition layer 20 for feeding the specific gas in the source gas to flow channel member 4 forming a permeate-side gas flow channel can be promoted. At least one kind of the carrier is present in hydrophilic resin composition layer 20 containing a hydrophilic resin, and the carrier reversibly reacts with a specific gas dissolved in water present in hydrophilic resin composition layer 20, whereby the specific gas is caused to selectively permeate therethrough. Specific examples of a substance that functions as a carrier, which is capable of reversibly reacting with an acidic gas, include, in the case where the acidic gas is $CO_2$, alkali metal carbonates, alkali metal bicarbonates, alkanolamine (for example, described in Japanese Patent No. 2086581 and the like), and alkali metal hydroxides (for example, described in WO 2016/024523 and the like); in the case where the acidic gas is sulfur oxide, sulfur-containing compounds, citrates of alkali metals, and transition metal composites (for example, described in Japanese Patent No. 2879057 and the like); and in the case where the acidic gas is nitrogen oxide, alkali metal nitrites and transition metal composites (for example, described in Japanese Patent No. 2879057 and the like).

Hydrophilic resin composition layer 20 may also contain, for example, a hydration reaction catalyst for the acidic gas, a surfactant to be described later and the like as an additive in addition to the hydrophilic resin and the carrier capable of reversibly reacting with a specific gas. The reaction rate between the acidic gas and the carrier capable of reversibly reacting with the acidic gas can be improved by using the hydration reaction catalyst for the acidic gas together.

The hydration reaction catalyst for the acidic gas preferably contains an oxo acid compound, more preferably contains at least one elemental oxo acid compound selected from the group consisting of group 14 elements, group 15 elements, and group 16 elements, and still more preferably at least one selected from the group consisting of a tellurious acid compound, a selenious acid compound, an arsenious acid compound, and an orthosilicic acid compound.

Gas separation membrane 2 includes first porous layer 21 as shown in FIG. 3. First porous layer 21 preferably has porosity with high gas permeability so as not to cause the diffusion resistance of a gas component that has permeated through hydrophilic resin composition layer 20. First porous layer 21 may have a single-layer structure or a laminated structure including two more layers. It is preferable that a member such as first porous layer 21 has heat resistance depending on process conditions in a plant for manufacturing hydrogen, urea or the like in which application of gas separation membrane 2 is assumed. Herein, the term "heat resistance" means that no curl occurs which can be visually confirmed due to heat shrinkage or heat melting even after the member such as first porous layer 21 is stored for 2 hours under the temperature conditions greater than or equal to the process condition, so that a form before the storage is maintained.

Examples of materials constituting first porous layer 21 include polyolefin resins such as polyethylene (PE) and polypropylene (PP); fluorine-containing resins such as polytetrafluoroethylene (PTFE), polyvinyl fluoride (PVF), and polyvinylidene fluoride (PVDF); polyester resins such as polyethylene terephthalate (PET), polyethylene naphthalate, and high-molecular-weight polyesters; resin materials such as polystyrene (PS), polyethersulfone (PES), polyphenylene sulfide (PPS), polysulfone (PSF), polyimide (PI), polyetherimide (PEI), polyetheretherketone (PEEK), heat-resistant polyamides, aramids, and polycarbonates; and inorganic materials such as metals, glasses, and ceramics. Among them, fluorine-containing resins and PP are more preferable.

The thickness of first porous layer 21 is not particularly limited, and from the viewpoint of mechanical strength, usually, the thickness is preferably within a range of 10 μm to 3000 μm, more preferably within a range of 10 μm to 500 μm, and still more preferably within a range of 15 μm to 150 μm. The average pore size of the pores of first porous layer 21 is not particularly limited, and the average pore size is preferably less than or equal to 10 μm, and more preferably within a range of 0.005 μm to 1.0 μm. The porosity of first porous layer 21 is preferably within a range of 5% to 99%, and more preferably within a range of 30% to 90%.

(Method for Producing Hydrophilic Resin Composition Layer 20)

The method for producing hydrophilic resin composition layer 20 may include the following three steps of a first step (coating liquid producing step), a second step (applying step), and a third step (drying step). It is preferable to use a roll-to-roll type coater or dryer that carries out the second and third steps while continuously conveying the porous body.

In the first step (coating liquid producing step), at least a hydrophilic resin, a carrier and a medium are mixed to prepare a coating liquid.

Examples of the medium include protic polar solvents such as water, and alcohols (such as methanol, ethanol, 1-propanol, or 2-propanol); nonpolar solvents such as toluene, xylene, and hexane; and aprotic polar solvents such as ketones (such as acetone, methyl ethyl ketone, and methyl isobutyl ketone), N-methylpyrrolidone, N,N-dimethylacetamide, and N,N-dimethylformamide. A single kind of medium may be used alone, or two or more kinds of media may be used in combination as long as they are compatible with each other. Among these, a medium containing at least one selected from the group consisting of water and alcohols (such as methanol, ethanol, 1-propanol, and 2-propanol) is preferable, and a medium containing water is more preferable.

The coating liquid may contain a surfactant as necessary. When the surfactant is added to the coating liquid and the coating liquid is applied to the porous body, the surfactant is localized at the interface between the porous body and hydrophilic resin composition layer 20 formed from the coating liquid, which provides improved wettability with the porous body, thereby allowing the unevenness of the film thickness of hydrophilic resin composition layer 20 and the like to be improved.

The surfactant is not particularly limited, and, for example, conventionally known surfactants such as polyoxyethylene polyoxypropylene glycols, polyoxyethylene alkyl phenyl ethers, polyoxyethylene alkyl ethers, fluorine-based surfactants, and silicone-based surfactants can be used. A single kind of surfactant may be used alone, or two or more kinds of surfactants may be used in combination.

In the second step (applying step), the coating liquid prepared in the first step is applied to one surface of the porous body to form a coated film. The temperature of the coating liquid in the second step may be appropriately determined depending on the composition and concentration of the coating liquid. An excessively high temperature may, however, evaporate the medium from the coating liquid in a large amount, possibly changing the composition and the concentration, and leaving a mark of evaporation in the coated film. The temperature is thus preferably within a range of higher than or equal to 15° C., more preferably higher than or equal to room temperature (20° C.), and preferably lower than or equal to the boiling point of the medium in use by 5° C. For example, when water is used as the medium, the temperature of the coating liquid in the second step is preferably within the temperature range of 15° C. to 95° C.

The method for applying the coating liquid to the porous body is not particularly limited, and examples thereof include spin coating, bar coating, die coating, blade coating, air-knife coating, gravure coating, roll coating, spray coating, dip coating, Comma roll method, kiss coater method, screen printing, and inkjet printing.

The application amount of the coating liquid in a weight per unit area (solid content per unit area) is preferably within a range of 1 $g/m^2$ to 1000 $g/m^2$, more preferably within a range of 5 $g/m^2$ to 750 $g/m^2$, and still more preferably within a range of 10 $g/m^2$ to 500 $g/m^2$. The adjustment of the weight per unit area can be controlled on the basis of the speed of forming the coated film (for example, the speed of conveying the porous body), the concentration of the coating liquid, the discharge amount of the coating liquid, and the like. The coating liquid may be applied to the porous body in a stripe pattern or a dot pattern.

The porous body to which the coating liquid is applied may be a member corresponding to first porous layer 21 of gas separation membrane 2 or a member corresponding to the second porous layer contained in gas separation membrane 2. In the case where the coating liquid is applied to the porous body corresponding to the second porous layer when producing hydrophilic resin composition layer 20, a step of laminating a porous body corresponding to first porous layer 21 on a surface of hydrophilic resin composition layer 20 opposite to the second porous layer may be included. In the case where the coating liquid is applied to the porous body corresponding to first porous layer 21 when producing hydrophilic resin composition layer 20, a step of laminating a porous body corresponding to a protective layer on a surface of gas separation membrane 2 opposite to first porous layer 21 may be included.

The porous body to which the coating liquid is applied may be a temporary coating member for forming hydrophilic resin composition layer 20. When the coating liquid is applied to the temporary coating member, a step of peeling off formed hydrophilic resin composition layer 20 from the temporary coating member and a step of laminating peeled-off hydrophilic resin composition layer 20 on first porous layer 21 or the second porous layer are included after a third step (drying step) to be described later. Therefore, the temporary coating member may be a porous body that can peel off hydrophilic resin composition layer 20 formed on the temporary coating member without damaging hydrophilic resin composition layer 20. In the case where peeled-off hydrophilic resin composition layer 20 is laminated on first porous layer 21, a step of laminating a porous body corresponding to the second porous layer on a surface of hydrophilic resin composition layer 20 facing first porous layer 21 may be included. In the case where peeled-off hydrophilic resin composition layer 20 is laminated on the second porous layer, a step of laminating a porous body corresponding to first porous layer 21 on a surface of hydrophilic resin composition layer 20 facing the second porous layer may be included.

In the third step (drying step), the medium is removed from the formed coated film. A method for removing the medium is not particularly limited, and a method is preferable in which heated air or the like is allowed to flow to evaporate the medium for removal in order to dry the coated film. Specifically, for example, the medium may be evaporated from the coated film for removal by putting the applied product (the porous body on which a coated film has been formed) into an air flowing drying furnace adjusted to have a predetermined temperature and a predetermined humidity.

The drying temperature of the coated film may be appropriately determined depending on the kind of the medium for the coating liquid and the kind of the porous body. Usually, the drying temperature is preferably higher than the freezing point of the medium and lower than the melting point of the material constituting the porous body. Normally, the drying temperature is suitably within a range of 80° C. to 200° C.

Hydrophilic resin composition layer 20 is formed through the drying step in the third step. The concentration of the medium contained in resulting hydrophilic resin composition layer 20 is preferably 1% by weight to 34% by weight.

The second step and the third step may be repeated at least once on an exposed surface of hydrophilic resin composition layer 20 (a surface opposite to a surface in contact with the porous body) to laminate hydrophilic resin composition layer 20. This can suppress formation of a pinhole of hydrophilic resin composition layer 20 that may be caused by unevenness and the like of the coated film formed by the application of the coating liquid. When the second step and the third step are repeated, individual hydrophilic resin composition layers 20 may be laminated either under different coating conditions (such as the composition of the coating liquid and the amount of the coating liquid applied) and drying conditions or under identical coating conditions and drying conditions. By performing the first step, the second step, and the third step, hydrophilic resin composition layer 20 included in gas separation membrane element 1 can be manufactured.

(Other Layers that May be Included in Gas Separation Membrane)

Gas separation membrane 2 of the separation membrane-flow channel member composite body may include one layer or at least two layers other than hydrophilic resin composition layer 20 and first porous layer 21.

As described above, gas separation membrane 2 may include a second porous layer provided on a surface of hydrophilic resin composition layer 20 opposite to first porous layer 21, for example, between hydrophilic resin composition layer 20 and flow channel member 3 forming a feed-side gas flow channel During the manufacture of gas separation membrane element 1, when the wound body is tightened, hydrophilic resin composition layer 20 and flow channel member 3 forming a feed-side gas flow channel may rub against each other. However, by providing second porous layer, hydrophilic resin composition layer 20 is protected, and the occurrence of damage due to the rubbing can be suppressed. The second porous layer is not particularly limited as long as it contains a material having less friction with flow channel member 3 forming a feed-side gas flow channel, and its material has excellent gas permeability. However, a material having heat resistance according to the temperature conditions under which gas separation membrane 2 is used is preferable, and the same materials as those mentioned as materials for constituting first porous layer 21 may be suitably used, for example.

As the second porous layer, for example, a porous membrane, a non-woven fabric, a woven fabric, a net and the like having an average pore size of 0.001 μm to 10 μm can be appropriately selected and used. The second porous layer may have a single-layer structure or a laminated structure including two or more layers.

As described above, gas separation membrane 2 may include a third porous layer provided on a surface of first porous layer 21 opposite to hydrophilic resin composition layer 20, for example, between first porous layer 21 and flow channel member 4 forming a permeate-side gas flow channel. When the third porous layer is provided, upon the production of gas separation membrane 2, strength that can withstand the tension load applied to first porous layer 21 can be additionally imparted in the step of forming hydrophilic resin composition layer 20 on first porous layer 21 used as a porous membrane to which a coating liquid is applied. Further, when the third porous layer is provided, upon the separation of a specific gas from the source gas using gas separation membrane 2, strength that can withstand the pressure load and the like applied to gas separation membrane 2 can be additionally imparted.

The third porous layer is not particularly limited as long as it has pressure resistance strength and stretch resistance, and has a structure and material having gas permeability. However, a material having heat resistance according to the temperature conditions under which gas separation membrane 2 is used is preferable. For example, the same materials as those mentioned as materials constituting first porous layer 21 can be suitably used.

As the third porous layer, for example, a non-woven fabric, a woven fabric, a net and the like having an average pore size of 0.001 μm to 10 μm can be appropriately selected and used. The third porous layer may have a single-layer structure or a laminated structure including two or more layers.

(Flow Channel Member Forming Feed-Side Gas Flow Channel and Separation Membrane-Flow Channel Member Composite Body Including the Same)

The separation membrane-flow channel member composite body includes gas separation membrane 2 folded in two and the flow channel member sandwiched in the folded gas separation membrane 2. The flow channel member may be flow channel member 3 forming a feed-side gas flow channel or flow channel member 4 forming a permeate-side gas flow channel. In the spiral-wound gas separation membrane element, the separation membrane-flow channel member composite body includes, for example, flow channel member 3 forming a feed-side gas flow channel.

Flow channel member 3 forming a feed-side gas flow channel, flow channel member 3 constituting the separation membrane-flow channel member composite body that is included in the spiral-wound gas separation membrane element, forms a flow channel space to which the source gas is fed, and the flow channel space introduces the source gas into the wound body to feed the source gas to gas separation membrane 2.

Flow channel member 3 forming a feed-side gas flow channel preferably has a function as a flow channel material that forms a flow channel space for the source gas, and a function to reduce the pressure loss of the source gas to be fed as much as possible while causing a turbulent flow in the source gas to promote the surface renewal on the feed side surface of gas separation membrane 2. From this viewpoint, flow channel member 3 forming a feed-side gas flow channel preferably has a network shape (net shape, mesh shape or the like). Depending on the network shape, the flow channel for the source gas changes. Therefore, the shape of the unit cell of the network in flow channel member 3 forming a feed-side gas flow channel is preferably selected according to the purpose, for example, from shapes such as a square, a rectangle, a rhombus, and a parallelogram.

Examples of materials constituting flow channel member 3 forming a feed-side gas flow channel include resins and inorganic materials such as metals, glass, and ceramics. It is preferable that the material constituting flow channel member 3 forming a feed-side gas flow channel has heat resistance according to the temperature conditions under which gas separation membrane 2 is used. The material constituting flow channel member 3 forming a feed-side gas flow channel preferably has high mechanical strength (rigidity) from the viewpoint of maintaining the function as a flow channel material forming the flow channel space of the source gas.

Examples of materials having high heat resistance and rigidity include resin materials such as PE, PP, PTFE, PS, PPS, PES, PEEK, PI, and polycyclohexylene dimethylene terephthalate (PCT); inorganic materials such as metals, glass, and ceramics; and materials combining a resin material and an inorganic material.

It is preferable that flow channel member 3 forming a feed-side gas flow channel contains a layer formed of a non-woven fabric, a woven fabric, or a net containing at least one material selected from the group consisting of resins, metals, and glass. It is more preferable that flow channel member 3 forming a feed-side gas flow channel contains a layer formed of a non-woven fabric, a woven fabric, or a net containing at least one material selected from the group consisting of PE, PP, PTFE, PS, PPS, PES, PEEK, PI, PCT, metals, and glass.

Flow channel member 3 forming a feed-side gas flow channel may have a single-layer structure or a laminated structure of two or more layers. For example, feed-side flow channel member 3 may have a structure obtained by laminating a plurality of layers formed of the above non-woven fabric, woven fabric, or net.

From the viewpoint of the pressure loss of the distributed gas, mechanical strength, and the like, the thickness of flow channel member 3 forming a feed-side gas flow channel (in the case of a laminate structure including a plurality of layers, the total thickness thereof) is preferably within a range of 10 µm to 7500 µm, more preferably within a range of 50 µm to 5000 µm, and still more preferably within a range of 100 µm to 2500 µm.

Flow channel member 3 forming a feed-side gas flow channel has, for example, a rectangular shape having a thickness such as a rectangular parallelepiped shape. In this case, flow channel member 3 forming a feed-side gas flow channel has four end portions. Flow channel member 3 forming a feed-side gas flow channel includes a first cover covering one end portion of the four end portions. A structure body in which flow channel member 3 forming a feed-side gas flow channel, flow channel member 3 including the first cover, is sandwiched in the folded gas separation membrane 2 is a separation membrane-flow channel member composite body included in the spiral-wound gas separation membrane element or the like. As described above, for example, in the spiral-wound gas separation membrane element or the like, gas separation membrane 2 is folded such that first porous layer 21 is located outside, that is, first porous layer 21 is located outside hydrophilic resin composition layer 20.

Figure 4:
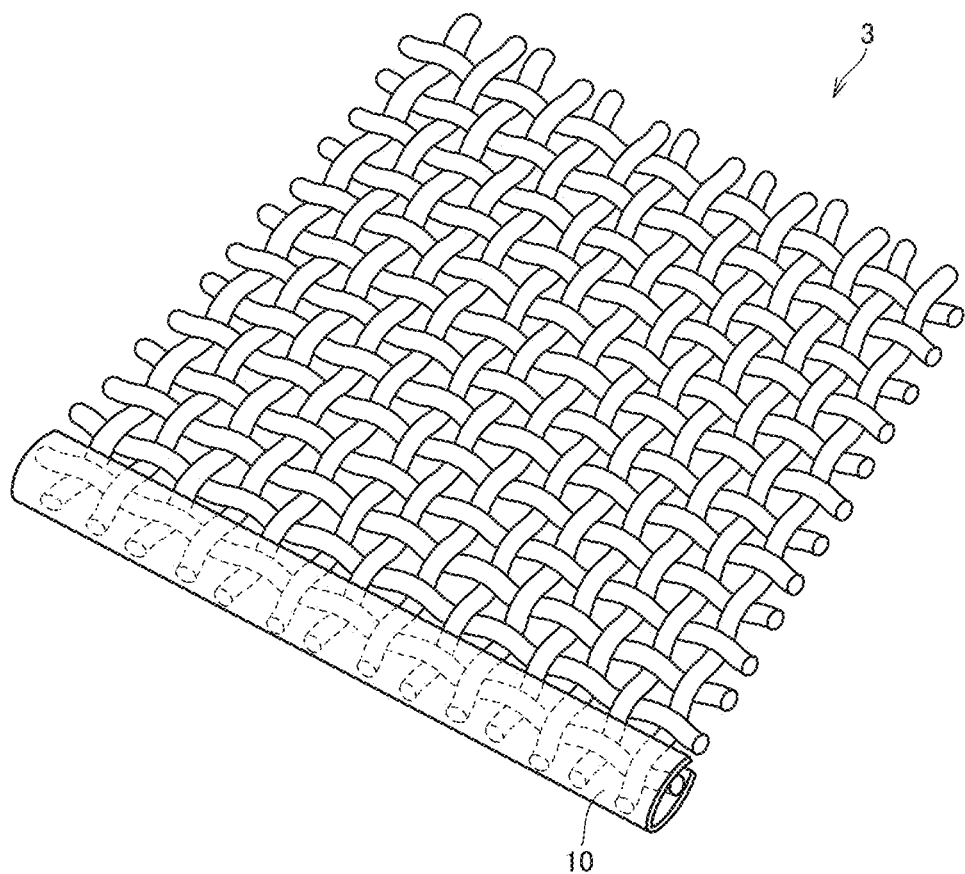
FIG. 4 is a schematic perspective view showing an example of a flow channel member including a first cover.
Figure 5:
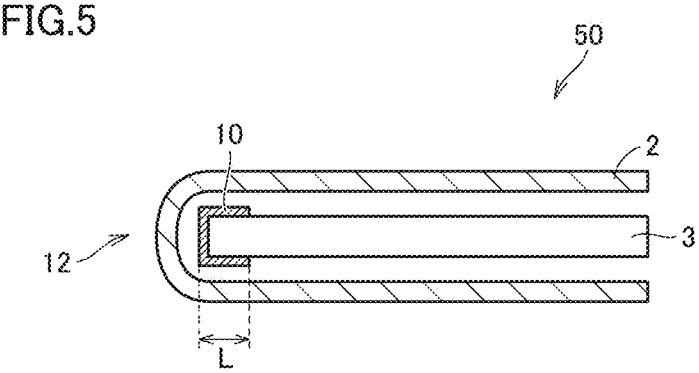
FIG. 5 is a cross-sectional view schematically showing an example of a separation membrane-flow channel member composite body including a flow channel member including a first cover.

FIG. 4 is a schematic perspective view showing an example of a flow channel member 3 forming a feed-side gas flow channel, flow channel member 3 including a first cover 10, and an example in which first cover 10 is provided on one end portion of flow channel member 3 forming a feed-side gas flow channel that has a network shape is shown. FIG. 5 is a cross-sectional view schematically showing an example of a separation membrane-flow channel member composite body 50 including flow channel member 3 forming a feed-side gas flow channel, flow channel member 3 including first cover 10. Flow channel member 3 forming a feed-side gas flow channel shown in FIGS. 4 and 5 includes first cover 10 covering one end portion thereof. In the example shown in FIGS. 4 and 5, first cover 10 includes a film disposed so as to cover the one end portion, more specifically, disposed so as to enclose the one end portion. Such a film can be fixed to an end portion of flow channel member 3 forming a feed-side gas flow channel using, for example, a double-sided tape or an adhesive.

The one end portion of flow channel member 3 forming a feed-side gas flow channel, flow channel member 3 being provided with first cover 10, is an end portion located closest to a turn-back part 12 of the folded gas separation membrane 2 among the four end portions in a state where flow channel member 3 forming a feed-side gas flow channel is sandwiched in the folded gas separation membrane 2, as shown in FIG. 5. A cover may be further provided that covers one or more end portions other than the above one end portion.

Gas separation membrane element 1 including separation membrane-flow channel member composite body 50 constituted by using flow channel member 3 forming a feed-side gas flow channel, flow channel member 3 including first cover 10, makes it possible to suppress a decrease in separation efficiency (separation selectivity). This is because when separation membrane-flow channel member composite body 50 is constituted and/or when laminated body 7 is wound around central tube 5, the disadvantage of damaging hydrophilic resin composition layer 20 is reduced even when flow channel member 3 forming a feed-side gas flow channel is in contact with the inner side of gas separation membrane 2 (for example, the side of hydrophilic resin composition layer 20). When hydrophilic resin composition layer 20 is damaged, at the damaged part, the source gas directly flows out to the side of flow channel member 4 forming a permeate-side gas flow channel without being separated, so that the separation efficiency (separation selectivity) is decreased. Although the gas separation membrane element having decreased separation efficiency may be a defective product, the present invention that can suppress the decrease in separation efficiency makes it possible to suppress a decrease in the product yield of a gas separation membrane element.

The present invention that uses separation membrane-flow channel member composite body 50 including flow channel member 3 forming a feed-side gas flow channel, flow channel member 3 including first cover 10, is particularly useful in the case where the above damage is apt to occur due to the shape and material of flow channel member 3 forming a feed-side gas flow channel, even if the second porous layer is provided between flow channel member 3 forming a feed-side gas flow channel and hydrophilic resin composition layer 20 of gas separation membrane 2, such as the case where flow channel member 3 forming a feed-side gas flow channel has a network shape, and a material protrudes in a linear form (rod form, needle form and the like) at its end portion, and the case where the rigidity of the material constituting flow channel member 3 forming a feed-side gas flow channel is high.

As described above, separation membrane-flow channel member composite body 50 including flow channel member 4 forming a permeate-side gas flow channel in place of flow channel member 3 forming a feed-side gas flow channel is also included in the present invention.

Japanese Utility Model Laying Open No. 60-148004 describes that when a net-like spacer used for a separation semipermeable membrane module is obtained by cutting an original fabric spacer, roundness is applied to the tip of the material protruding in the cut surface of the spacer, so that damage to the surface of a semipermeable membrane may be prevented. However, according to the study of the present inventors, only application of roundness to the tip of the material is difficult to suppress the decrease in the separation efficiency of the gas separation membrane element and the decrease in the product yield.

If first cover 10 covers at least part of the end portion located closest to turn-back part 12 of the foldedgas separation membrane 2, among the four end portions of flow channel member 3 forming a feed-side gas flow channel, first cover 10 exhibits the above effects. However, it is preferable that first cover 10 covers the whole end portion in order to more effectively suppress the decrease in the separation efficiency of the gas separation membrane element and to more effectively suppress the decrease in the product yield.

When first cover 10 includes a film, it is preferable to use as a film material a resin material through which a linear form (rod form, needle form and the like) material does not penetrate when the linear form material is stuck to the end portion of flow channel member 3 forming a feed-side gas flow channel. Specific examples of the film material include PE, PP, PTFE, PS, PPS, PES, PEEK, PI, and PCT.

The thickness of the film is preferably within a range of 2 µm to 150 µm, and more preferably in a range of 5 µm to 100 µm from the viewpoint of more effectively suppressing the decrease in the separation efficiency of the gas separation membrane element and more effectively suppressing the decrease in the product yield.

When first cover 10 includes a film, as shown in FIGS. 4 and 5, it is preferable to provide first cover 10 so as to enclose the end portion region including the end face rather than to provide first cover 10 only on the end face of the end portion, from the viewpoint of the adhesiveness of first cover 10 to flow channel member 3 forming a feed-side gas flow channel. That is, it is preferable that one end of the film is disposed on one main surface of flow channel member 3 forming a feed-side gas flow channel, and the other end of the film is disposed on the other main surface of flow channel member 3 forming a feed-side gas flow channel. In this case, the length of the film (length L in FIG. 5) disposed on each of one and the other of the main surfaces of flow channel member 3 forming a feed-side gas flow channel may be within a range of about 5 mm to 100 mm.

First cover 10 is not limited to one composed of a film, and when flow channel member 3 forming a feed-side gas flow channel (first cover 10) is in contact with the feed side of gas separation membrane 2, any configuration that allows the contact to be line contact or surface contact may be used. For example, another example of first cover 10 includes covering of the end portion of flow channel member 3 forming a feed-side gas flow channel with a resin or a cured material of a resin.

First cover 10 may be a combination of the film with a coated layer formed of the resin or the cured material of a resin.

The coated layer formed of the resin or the cured material of a resin can be formed by coating the end portion of flow channel member 3 forming a feed-side gas flow channel with a resin composition containing a thermoplastic resin or a curable resin, followed by curing as necessary. The coated layer formed of the resin or the cured material of a resin, which is formed in this manner, usually serves as a layer that reaches the inner part of flow channel member 3 forming a feed-side gas flow channel at a certain depth from the coated surface, and makes it possible to fill the gaps of the network material protruding to the end face of the end portion to provide a continuous end face. Therefore, the use of first cover 10 formed of the resin or the cured material of a resin also makes it possible to suppress the decrease in the separation efficiency of the gas separation membrane element and suppress the decrease in the product yield.

Examples of the resin contained in the resin composition include epoxy-based resins, vinyl chloride copolymer-based resins, vinyl chloride-vinyl acetate copolymer-based resins, vinyl chloride-vinylidene chloride copolymer-based resins, vinyl chloride-acrylonitrile copolymer-based resins, butadiene-acrylonitrile copolymer-based resins, polyamide-based resins, polyvinyl butyral-based resins, polyester-based resins, cellulose derivative-based (nitrocellulose and the like) resins, styrene-butadiene copolymer-based resins, various synthetic rubber-based resins, phenol-based resins, urea-based resins, melamine-based resins, phenoxy-based resins, silicone-based resins, and urea formamide-based resins. Among these, epoxy-based resins (epoxy-based adhesive resins) are preferable. That is, it is preferable that the coated layer contains a cured material of an epoxy-based resin.

The curable epoxy-based resin only needs to be a compound that contains an epoxy group that is cured with an amine, an acid anhydride or the like, and may be of a one-pack-curing type or a two-pack-mixture type from the viewpoint of a curing type. The curable epoxy-based resin may be of a heat curing type or a normal temperature curing type from the viewpoint of curing temperatures. The resin composition may contain an inorganic or organic filler so as to adjust a viscosity during use of the resin composition and improve strength after curing, and may contain a curing catalyst as necessary.

The resin composition may be known as an adhesive composition or commercially available.

As described above, when the end portion of flow channel member 3 forming a feed-side gas flow channel is covered with the resin or the cured material of a resin, a film may be laminated on one surface of the end portion, followed by forming the first cover. The film may be removed after the first cover is formed, or may be included in the gas separation membrane element without being removed. The film may be a material in which the resin composition containing a thermoplastic resin or a curable resin, the resin composition forming the first cover, soaks, or may be a material in which the resin composition does not soak. However, from the viewpoint of preventing the expansion and adhesion of the resin composition to members other than the first cover, a material in which the resin composition does not soak is preferable.

Figure 6:
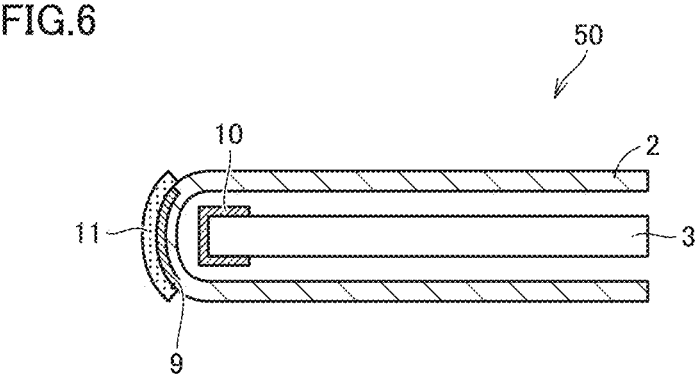
FIG. 6 is a cross-sectional view schematically showing another example of the separation membrane-flow channel member composite body including a flow channel member including a first cover.

FIG. 6 is a cross-sectional view schematically showing another example of separation membrane-flow channel member composite body 50 including flow channel member 3 forming a feed-side gas flow channel, flow channel member 3 including first cover 10.

As in the example shown in FIG. 6, separation membrane-flow channel member composite body 50 includes flow channel member 3 forming a feed-side gas flow channel, flow channel member 3 including first cover 10, and further, the folded gas separation membrane 2 may have a penetration region 9 formed of a resin or a cured material of a resin on an outer side of turn-back part 12 thereof. Penetration region 9 fills pores of first porous layer 21 and the like of gas separation membrane 2 in a region where penetration region 9 is formed, to suppress or block the diffusion of a gas from the permeate side of hydrophilic resin composition layer 20 of gas separation membrane 2. Therefore, even if damage such as breakage or cracking of hydrophilic resin composition layer 20 might occur in turn-back part 12, the outflow of the source gas to the side of flow channel member 4 forming a permeate-side gas flow channel through the damaged part of hydrophilic resin composition layer 20 can be suppressed by forming penetration region 9. This contributes to the suppression of the decrease in the separation efficiency of the gas separation membrane element and the suppression of the decrease in the product yield.

It is preferable that a location where penetration region 9 is formed is on the outside of turn-back part 12 where the damage of hydrophilic resin composition layer 20 is relatively apt to occur in turn-back part 12, and penetration region 9 is formed so as to include a region having the largest folding curvature. The width of penetration region 9 (the length of an outer arc defining a region representing penetration region 9 with reference to FIG. 6) is, for example, within a range of about 10 mm to 200 mm.

Penetration region 9 can be formed by applying the resin composition containing a thermoplastic resin or a curable resin to the outer surface of turn-back part 12 and curing the resin composition as necessary. Penetration region 9 formed of a resin or a resin cured product, which is formed in this manner, usually forms a layer that reaches the inner part of gas separation membrane 2 at a certain depth from the application surface, and fills pores where penetration region 9 reaches. Penetration region 9 preferably has a depth reaching first porous layer 21, and may reach the surface of first porous layer 21 on the side of hydrophilic resin composition layer 20.

Penetration region 9 may be formed after gas separation membrane 2 is folded, or may be formed before gas separation membrane 2 is folded.

As the resin composition for forming penetration region 9, the same resin composition as that described for first cover 10 can be used, and the description of the resin composition for first cover 10 is cited as the specific example and the like. Penetration region 9 preferably contains a cured material of an epoxy-based resin.

The resin composition for forming penetration region 9 may be known as an adhesive composition or commercially available.

When penetration region 9 is formed, a region through which the resin composition is caused to penetrate may be subjected to a hydrophilization treatment prior to the application of the resin composition in order to improve the penetrability of the resin composition. The hydrophilization treatment can be performed, for example, by applying a surfactant similar to that to be added to the coating liquid when gas separation membrane 2 described above is manufactured.

As shown in FIG. 6, gas separation membrane 2 of separation membrane-flow channel member composite body 50 may further include a second cover 11 disposed on penetration region 9 on the outside of the turn-back part. By further providing second cover 11, penetration region 9 can be protected, and the expansion and adhesion of the resin composition applied to penetration region 9 to a region other than penetration region 9 or a member other than separation membrane-flow channel member composite body 50 can be prevented, so that this can contribute to the suppression of the decrease in the separation efficiency of the gas separation membrane element and the suppression of the decrease in the product yield.

Second cover 11 may be a film disposed on penetration region 9. The film is preferably disposed to cover penetration region 9, and more preferably to cover whole penetration region 9. The film can be disposed and fixed on penetration region 9 using, for example, a double-sided tape, an adhesive or the like.

As the material of the film constituting second cover 11, a resin material is preferably used in which the resin composition penetrating through penetration region 9 does not soak. When the resin composition is a thermosetting resin, a resin material having heat resistance according to the heat curing temperature conditions of the resin composition is preferably used. The material and thickness of the film constituting second cover 11 may be similar to those of the film material described for first cover 10, and the description for first cover 10 is cited for second cover 11.

[Flow Channel Member Forming Permeate-Side Gas Flow Channel]

Flow channel member 4 forming permeate-side gas flow channel forms a flow channel space through which a permeate gas that has permeated through gas separation membrane 2 flows. This flow channel space introduces the permeate gas into central tube 5.

Flow channel member 4 forming a permeate-side gas flow channel preferably has a function as a flow channel material that forms the flow channel space for the permeate gas, and a function to cause a turbulent flow in the permeate gas to promote the surface renewal on the permeate side surface of gas separation membrane 2. From this viewpoint, flow channel member 4 forming a permeate-side gas flow channel preferably has a network shape (net-like, mesh-like, and the like). Depending on the network shape, the flow channel for the permeate gas changes. Therefore, the shape of the unit cell of the network in flow channel member 4 forming a permeate-side gas flow channel is preferably selected according to the purpose, for example, from shapes such as a square, a rectangle, a rhombus, and a parallelogram.

The material constituting flow channel member 4 forming a permeate-side gas flow channel is not particularly limited. A material having heat resistance according to the temperature conditions under which gas separation membrane 2 is used is preferable, and the same materials as the resin materials mentioned as the materials constituting first porous layer 21 may be suitably used, for example. Specifically, PTFE, PES, PSF, PEEK, PI, and metals are preferable, and PTFE, PPS, PEEK, and metals are more preferable. Flow channel member 4 forming a permeate-side gas flow channel may have a single-layer structure or a laminated structure of two or more layers.

[Central Tube]

Central tube 5 is a conduit for collecting the permeate gas that has permeated through gas separation membrane 2 and discharging the same from gas separation membrane element 1. A material for central tube 5 is not particularly limited, and the material is preferably a material having heat resistance according to the temperature conditions under which gas separation membrane 2 is used. Since gas separation membrane 2 and the like are wound around the outer periphery of central tube 5 a plurality of times to form a wound body, a material for central tube 5 is preferably a material having mechanical strength. As the material for central tube 5, for example, stainless steel or the like is suitably used. The diameter, length, and thickness of central tube 5 are appropriately set depending on the size of gas separation membrane element 1, the number of separation membrane-flow channel member composite bodys 50 included in laminated body 7, the amount of the permeate gas, and the mechanical strength required for central tube 5, and the like.

Central tube 5 is preferably a circular tube when the wound body is in a cylindrical shape, and is preferably a square tube when the wound body is in a rectangular cylindrical shape.

As shown in FIG. 2, central tube 5 has a plurality of perforations 30 on the outer peripheral surface of central tube 5. Perforations 30 communicate between the flow channel space for the permeate gas of flow channel member 4 forming a permeate-side gas flow channel and an inner hollow space of central tube 5. The number of perforations 30 and size of perforations 30 provided in central tube 5 are determined in consideration of the amount of the permeate gas fed from flow channel member 4 forming a permeate-side gas flow channel or the mechanical strength required for central tube 5. For example, when the size of the perforations provided in central tube 5 cannot be increased, the number of the perforations provided in central tube 5 may be increased to secure the flow channel of the permeate gas. Perforations 30 provided in central tube 5 may be formed at equal intervals in the direction parallel to the axis of central tube 5, or may also be localized on one end side of central tube 5.

<Method for Manufacturing Spiral-Wound Gas Separation Membrane Element>

A method for manufacturing gas separation membrane element 1 that is a spiral-wound gas separation membrane element includes steps of:
providing first cover 10 covering one end portion of a flow channel member forming a gas flow channel; and
disposing first cover 10 of the flow channel member forming a gas flow channel, the flow channel member including first cover 10, closest to turn-back part 12 of the folded gas separation membrane 2 folded to manufacture separation membrane-flow channel member composite body 50.

Separation membrane-flow channel member composite body 50 includes the folded gas separation membrane 2 and the flow channel member forming a gas flow channel, the flow channel member being sandwiched in the folded gas separation membrane 2. Gas separation membrane 2 includes first porous layer 21 and hydrophilic resin composition layer 20. In the case where the flow channel member sandwiched in the folded gas separation membrane 2 is flow channel member 3 forming a feed-side gas flow channel, gas separation membrane 2 is folded such that first porous layer 21 is located outside, that is, first porous layer 21 is located outside hydrophilic resin composition layer 20.

In gas separation membrane element 1 that is a spiral-wound gas separation membrane element, the above-mentioned flow channel member forming a gas flow channel is usually flow channel member 3 forming a feed-side gas flow channel.

As described above, the one end portion is an end portion disposed closest to turn-back part 12 of gas separation membrane 2 in separation membrane-flow channel member composite body 50 among four end portions of the flow channel member forming a gas flow channel.

The step of manufacturing separation membrane-flow channel member composite body 50 includes a step of folding gas separation membrane 2 in two to form turn-back part 12.

Gas separation membrane 2 of separation membrane-flow channel member composite body 50 may have penetration region 9 described above disposed on the outer side of turn-back part 12 thereof. In this case, the method for manufacturing a spiral-wound gas separation membrane element further includes a step of forming penetration region 9. More specifically, the step of manufacturing separation membrane-flow channel member composite body 50 includes steps of:
forming penetration region 9 formed of a resin or a cured material of a resin in gas separation membrane 2; and
folding gas separation membrane 2 in two to form turn-back part 12.

The order of carrying out the step of forming penetration region 9 and the step of forming turn-back part 12 is not particularly limited.

Gas separation membrane 2 of separation membrane-flow channel member composite body 50 may further include second cover 11 described above. In this case, the step of manufacturing separation membrane-flow channel member composite body 50 further includes a step of providing second cover 11 on penetration region 9.

Figure 7:
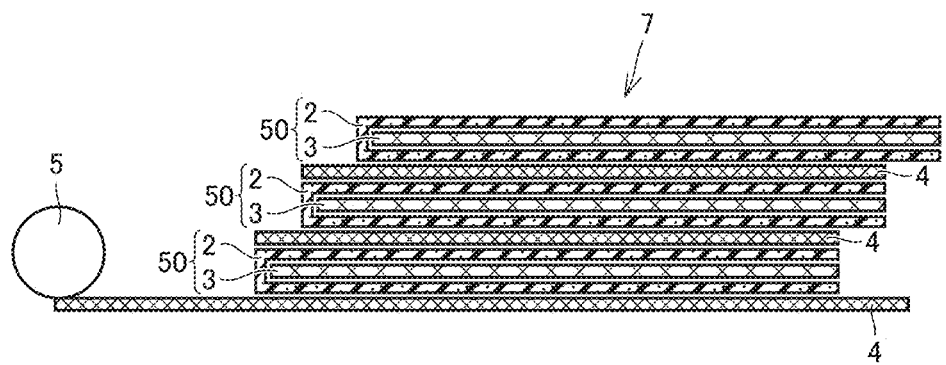
Figure 7:
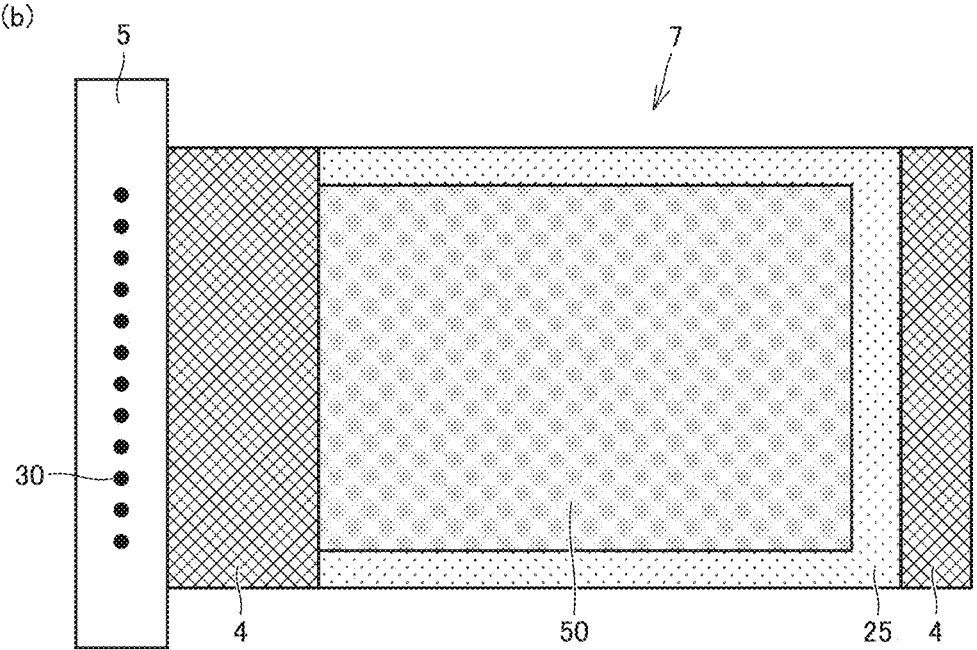

More specifically, gas separation membrane element 1 can be manufactured as follows. Hereinafter, a method for manufacturing gas separation membrane element 1 will be described with reference to FIGS. 7(a) and 7(b) in the case where the flow channel member constituting separation membrane-flow channel member composite body 50 is flow channel member 3 forming a feed-side gas flow channel. FIG. 7 shows developed gas separation membrane element 1 as an example, in which FIGS. 7(a) and 7(b) are respectively a schematic cross-sectional view and schematic plan view thereof.

In FIG. 7(b), only lowermost flow channel member 4 forming a permeate-side gas flow channel (flow channel member 4 forming a permeate-side gas flow channel, flow channel member 4 being fixed to central tube 5) that is shown in FIG. 7(a), and separation membrane-flow channel member composite body 50 laminated thereon are shown.

First, when a wound body is formed, an end portion (an end portion located on an inner peripheral side in the wound body) closer to central tube 5 in the end portions of flow channel member 4 forming a permeate-side gas flow channel positioned at both ends in a direction orthogonal to the axis of central tube 5 is fixed to the outer peripheral surface of central tube 5 by using a pressure-sensitive adhesive tape, an adhesive or the like.

A plurality of separation membrane-feed-side flow channel member composite bodies 50 are produced, which are composed of gas separation membrane 2 folded in two and flow channel member 3 forming a feed-side gas flow channel, flow channel member 3 being sandwiched in the folded gas separation membrane 2. As described above, flow channel member 3 forming a feed-side gas flow channel includes first cover 10 covering one end portion located closest to turn-back part 12 of gas separation membrane 2. Flow channel member 3 forming a feed-side gas flow channel may further include penetration region 9 on the outer side of turn-back part 12 in addition to first cover 10, and may further include second cover 11. The methods for forming first cover 10, penetration region 9, and second cover 11 are as described above.

In the case where a porous body used in producing hydrophilic resin composition layer 20 serves as a second porous layer of gas separation membrane 2, first porous layer 21 may be laminated on a surface where hydrophilic resin composition layer 20 formed on one surface of the porous body is exposed, followed by folding gas separation membrane 2 such that the second porous layer of gas separation membrane 2 including the second porous layer faces the inside, thereby forming separation membrane-flow channel member composite body 50. In the case where the porous body used in producing hydrophilic resin composition layer 20 serves as first porous layer 21 of gas separation membrane 2, the second porous layer may be laminated on the surface where hydrophilic resin composition layer 20 formed on one surface of the porous body is exposed.

In the case where gas separation membrane 2 includes a third porous layer, the third porous layer may be laminated on first porous layer 21 of gas separation membrane 2. Specifically, when hydrophilic resin composition layer 20 is produced, the third porous layer may be laminated in advance on the porous body corresponding to first porous layer 21, followed by providing hydrophilic resin composition layer 20 on a side opposite to the side of the third porous layer of the porous body corresponding to first porous layer 21. Examples of the method for laminating the third porous layer on the porous body include heat fusion of the surface with which the porous body and the third porous layer are in contact, and fixing between the porous body and the third porous layer using an adhesive or a pressure sensitive adhesive.

In the production of separation membrane-flow channel member composite body 50, flow channel member 3 forming a feed-side gas flow channel, flow channel member 3 including first cover 10, may be sandwiched by folding gas separation membrane 2 in two, and thereafter inserting flow channel member 3 forming a feed-side gas flow channel, or by disposing flow channel member 3 forming a feed-side gas flow channel at a predetermined position on gas separation membrane 2, and thereafter folding gas separation membrane 2 such that flow channel member 3 forming a feed-side gas flow channel is covered with gas separation membrane 2. The former is preferable because flow channel member 3 forming a feed-side gas flow channel can be more accurately positioned.

In the case where gas separation membrane 2 is folded in two, and flow channel member 3 forming a feed-side gas flow channel is then inserted, flow channel member 3 forming a feed-side gas flow channel may be inserted from an opening facing turn-back part 12, or flow channel member 3 forming a feed-side gas flow channel may be inserted from the other opening (any of side openings). However, when flow channel member 3 forming a feed-side gas flow channel is inserted into the folded gas separation membrane 2, a grip portion for flow channel member 3 forming a feed-side gas flow channel is easily secured, so that flow channel member 3 forming a feed-side gas flow channel is preferably inserted from the opening facing turn-back part 12.

The plurality of separation membrane-flow channel member composite bodies 50 to be produced may be the same or different with respect to the presence or absence and configuration of penetration region 9 and second cover 11.

Next, one separation membrane-flow channel member composite body 50 is laminated on flow channel member 4 forming a permeate-side gas flow channel, flow channel member 4 being fixed to central tube 5. At this time, separation membrane-flow channel member composite body 50 is laminated so that turn-back part 12 of gas separation membrane 2 is directed to the side of central tube 5, and turn-back part 12 is disposed at a position spaced away from the outer peripheral surface of central tube 5.

Then, an adhesive is applied to an exposed surface of separation membrane-flow channel member composite body 50 laminated on flow channel member 4 forming a permeate-side gas flow channel (a surface opposite to flow channel member 4 forming a permeate-side gas flow channel in separation membrane-flow channel member composite body 50). Specifically, an adhesive is applied to both end portions in a width direction (a direction parallel to central tube 5) and one end portion (a side far from central tube 5) in a length direction (a direction orthogonal to central tube 5) in separation membrane-flow channel member composite body 50 (bonded portion 25 in FIG. 7(b)).

On the exposed surface of separation membrane-flow channel member composite body 50 to which the adhesive has been applied, flow channel member 4 forming a permeate-side gas flow channel and separation membrane-flow channel member composite body 50 (hereinafter, sometimes referred to as "next flow channel member 4 forming a permeate-side gas flow channel" and "next separation membrane-flow channel member composite body 50" respectively) are bonded and laminated in that order. At this time, the areas of next flow channel member 4 forming a permeate-side gas flow channel and next separation membrane-flow channel member composite body 50 are less than or equal to those of flow channel member 4 forming a permeate-side gas flow channel and separation membrane-flow channel member composite body 50 laminated in advance.

Next flow channel member 4 forming a permeate-side gas flow channel may be laminated so that an end portion close to central tube 5 among the end portions positioned at both ends in the direction orthogonal to the axis of central tube 5 coincides with an end portion close to central tube 5 among the end portions in the length direction of separation membrane-flow channel member composite body 50 laminated in advance, or may be bonded to the exposed surface of flow channel member 4 forming a permeate-side gas flow channel 5 laminated in advance.

Next separation membrane-flow channel member composite body 50 is laminated so as to be disposed at a position spaced away from the outer peripheral surface of central tube 5 with respect to next flow channel member 4 forming a permeate-side gas flow channel.

When the above procedure is repeated to laminate flow channel member 4 forming a permeate-side gas flow channel and separation membrane-flow channel member composite body 50, there is formed laminated body 7 in which flow channel member 4 forming a permeate-side gas flow channel and separation membrane-flow channel member composite body 50 are laminated so that an end portion close to central tube 5 among the end portions located at both ends in the direction orthogonal to the axis of central tube 5, of flow channel member 4 forming a permeate-side gas flow channel and separation membrane-flow channel member composite body 50 are sequentially spaced away from central tube 5.

Thereafter, an adhesive is also applied to the exposed surface of separation membrane-flow channel member composite body 50 finally laminated in the same manner as described above, and laminated body 7 is wound around central tube 5 so as to cover perforations 30 of central tube 5 with flow channel member 4 forming a permeate-side gas flow channel, thereby forming a wound body.

As described above, flow channel member 4 forming a permeate-side gas flow channel and separation membrane-flow channel member composite body 50 are laminated so as to be gradually spaced away from central tube 5 at a predetermined interval, whereby the wound body can be formed such that the end portions of flow channel member 4 forming a permeate-side gas flow channel and separation membrane-flow channel member composite body 50 on the side of central tube 5 are arranged in the circumferential direction of central tube 5 at predetermined intervals when laminated body 7 is wound around central tube 5. Accordingly, it is possible that central tube 5 efficiently collects the permeate gas flowing through flow channel member 4 forming a permeate-side gas flow channel.

The above-mentioned adhesive is not particularly limited as long as it can bond separation membrane-flow channel member composite body 50 and flow channel member 4 forming a permeate-side gas flow channel. The adhesive is preferably a material having both heat resistance and moisture resistance according to the temperature and humidity conditions under which gas separation membrane 2 is used.

Examples of the adhesive include an adhesive containing as an adhesive component a resin, such as epoxy-based resins, vinyl chloride copolymer-based resins, vinyl chloride-vinyl acetate copolymer-based resins, vinyl chloride-vinylidene chloride copolymer-based resins, vinyl chloride-acrylonitrile copolymer-based resins, butadiene-acrylonitrile copolymer-based resins, polyamide-based resins, polyvinyl butyral-based resins, polyester-based resins, cellulose derivative-based (nitrocellulose and the like) resins, styrene-butadiene copolymer-based resins, various synthetic rubber-based resins, phenol-based resins, urea-based resins, melamine-based resins, phenoxy-based resins, silicone-based resins, and urea formamide-based resins. Among these, epoxy-based resins (epoxy-based adhesive resins) and silicone-based resins are preferable, and epoxy-based resins are more preferable.

The epoxy resin only needs to be a compound that contains an epoxy group that is cured with an amine, an acid anhydride or the like, and may be of a one-pack curing type or a two-pack mixing type from the viewpoint of a curing type. The epoxy-based resin may be of a heat curing type or a normal temperature curing type from the viewpoint of curing temperatures. A sealing material may contain an inorganic or organic filler so as to adjust a viscosity during use of the resin composition and improve strength after curing, and may contain a curing catalyst as necessary.

From the viewpoint of preventing the adhesive from spreading to make bonded portion 25 large and to make an effective area of gas separation membrane 2 small, the viscosity of the adhesive at 25° C. is preferably within a range of 5000 cP to 50000 cP, and more preferably within a range of 20000 cP to 50000 cP.

The method for bonding separation membrane-flow channel member composite body 50 and flow channel member 4 forming a permeate-side gas flow channel is not limited to a method using an adhesive.

Laminated body 7 is preferably wound around central tube 5 under tension. The adhesive is preferably applied in advance to both end portions in a direction parallel to the axis of central tube 5 of flow channel member 4 forming a permeate-side gas flow channel where separation membrane-flow channel member composite body 50 is not laminated when laminated body 7 is wound around central tube 5.

After the laminated body 7 is wound around central tube 5 to obtain a wound body, an outer peripheral tape is wound around and fixed to the outer peripheral surface of the wound body, whereby the unwinding of the wound body can be suppressed. In order to prevent the winding collapse (telescope) phenomenon of the wound body from occurring during the use of gas separation membrane element 1, an anti-telescope device can be attached to both end portions of the wound body. A reinforcing material as an outer wrap (reinforcing layer) may be further wound around the outer periphery of the wound body around which the outer peripheral tape has been wound and to which the anti-telescope device has been attached. Thereby, spiral-wound gas separation membrane element 1 can be manufactured.

<Gas Separation Membrane Module>

A gas separation membrane module includes at least one gas separation membrane element 1 in a housing (container) made of, for example, stainless steel. The gas separation membrane module can be manufactured by enclosing at least one gas separation membrane element 1 in the housing, and attaching an inlet/outlet port for source gas and an outlet port for permeate gas to the housing.

The arrangement and number of gas separation membrane elements 1 can be selected depending on the recovery ratio of a specific gas to be required. The recovery ratio of the specific gas is a value calculated by the following formula:

Recovery ratio of specific gas=(flow rate of specific gas in permeate gas/flow rate of specific gas in source gas)×100.

In the case where two or more gas separation membrane elements 1 are disposed in the housing, two or more gas separation membrane elements 1 may be arranged in parallel or in series in the housing. Arrangement in parallel means that at least a source gas is distributed and introduced into a feed-side end portion 31 (FIG. 2) of a plurality of gas separation membrane elements 1. Arrangement in series means that a source gas (retentate gas) that has not permeated through gas separation membrane 2 and discharged from a discharge-side end portion 33 (FIG. 2) in at least upstream gas separation membrane element 1 is introduced into feed-side end portion 31 of downstream gas separation membrane element 1.

For example, in the case where two gas separation membrane elements 1 are arranged in parallel in the housing, the configuration may be such that gas separation membrane elements 1 are disposed apparently in series in the housing; a source gas is fed from the inlet port provided in the housing to two gas separation membrane elements 1 in parallel; and a retentate gas that has not permeated through gas separation membrane 2 of each gas separation membrane element 1 is discharged from the outlet port provided in the housing. In this case, the inlet port of the source gas and the outlet port of the retentate gas provided in the housing may each be provided for every gas separation membrane element 1, or may also be shared by two gas separation membrane elements 1. Alternatively, it is also possible that the source gas inlet port is provided as a single, and the retentate gas outlet port is provided for every gas separation membrane element 1 to provide two outlet ports. Conversely, it is also possible that the source gas inlet port is provided for every gas separation membrane element 1 to provide two inlet ports, and the retentate gas outlet port is provided as a single.

<Gas Separation Apparatus>

A gas separation apparatus includes at least one gas separation membrane module. The arrangement and number of gas separation membrane modules provided in the gas separation apparatus can be selected according to the required throughput, the recovery rate of a specific gas, the size of the place to install the gas separation apparatus, and the like.

A source gas is introduced into the housing from the feed port of the gas separation membrane module, and is continuously fed to flow channel member 3 forming a feed-side gas flow channel from feed-side end portion 31 of gas separation membrane element 1 in the housing (an arrow a in FIG. 2). The specific gas contained in the source gas flowing through flow channel member 3 forming a feed-side gas flow channel permeates through gas separation membrane 2. The permeate gas having permeated through gas separation membrane 2 flows in flow channel member 4 forming a permeate-side gas flow channel, and is fed from perforations 30 to central tube 5. The permeate gas is continuously collected from a discharge port 32 of central tube 5 (an arrow b in FIG. 2), and then discharged from the permeate gas discharge port of the gas separation membrane module in communication with the inside of central tube 5. Meanwhile, the retentate gas that has not permeated through gas separation membrane 2 is continuously discharged from a discharge-side end portion 33 of the gas separation membrane module (an arrow c in FIG. 2), and then discharged from the retentate gas discharge port of the gas separation membrane module in communication with discharge-side end portion 33. Thus, the specific gas can be separated from the source gas.

EXAMPLES

Hereinafter, the present invention will be more specifically described with reference to Examples and Comparative Examples; however, the present invention is not intended to be limited thereto.

(Gas Leakage Test of Gas Separation Membrane Element)

Figure 8:
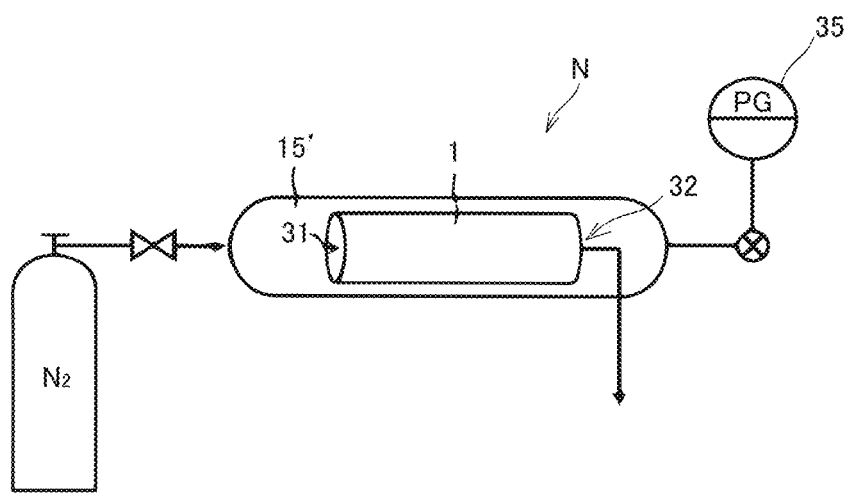
FIG. 8 is a schematic side view illustrating a test apparatus for performing a gas leakage test of a spiral-wound gas separation membrane element.

As shown in FIG. 8, gas separation membrane element 1 was fixed in a housing 15' made of stainless steel in a test apparatus N such that the side of a feed-side end portion 31 disposed at a feed side of gas separation membrane element 1 and the side of discharge port 32 of central tube 5 were separated from each other by gas separation membrane 2 of gas separation membrane element 1. Central tube 5 was extended to the outside of housing 15' on the side of discharge port 32, and was closed on the opposite side. Gas separation membrane element 1 was opened into housing 15' on the feed-side discharge port side. That is, a gas fed to housing 15' was caused to flow into gas separation membrane element 1 from the feed-side supply port and discharge port of gas separation membrane element 1.

A cylinder for feeding nitrogen ($N_2$) gas into housing 15' was attached via a valve, and a pressure gauge 35 for measuring a pressure in housing 15' was attached.

$N_2$ gas having room temperature (20° C.) was fed into housing 15', and a pressure of 1500 kPaG (G indicates a gauge pressure) was applied to the side of feed-side end portion 31 of gas separation membrane element 1. The pressure was confirmed by pressure gauge 35. Meanwhile, the pressure on the side of discharge port 32 of central tube 5 was adjusted to atmospheric pressure.

A gas leakage test of gas separation membrane element 1 was performed by measuring the time change of the pressure in housing 15' with pressure gauge 35 while the above state was maintained, to evaluate the $N_2$ gas permeation performance of gas separation membrane element 1. Specifically, the permeance (mol/($m^2 \cdot s \cdot kPa$)) of $N_2$ was calculated based on the time change of the measured pressure. When the permeance was less than or equal to $1.0 \times 10^{-7}$ mol/($m^2 \cdot s \cdot kPa$), the gas tightness of gas separation membrane element 1 was evaluated to be maintained, and gas separation membrane element 1 passed the test.

Example 1

(1) Production of Hydrophilic Resin Composition Layer 20

Into a container, 161.38 g of water as a medium, 4 g of crosslinked polyacrylic acid ("AQUPEC HV-501", manufactured by Sumitomo Seika Chemicals Co., Ltd.) as a hydrophilic resin, and 0.8 g of non-crosslinked polyacrylic acid ("AQUPAANA AP-40F", manufactured by Sumitomo Seika Chemicals Co., Ltd., 40% Na saponification) as a hydrophilic resin were charged and dispersed. Next, 38.09 g of a 50% cesium hydroxide aqueous solution was added to the dispersion, followed by mixing. Furthermore, 12.71 g of a 10% sodium tellurite aqueous solution as an additive was added to the mixture, followed by mixing. 1.2 g of a 10% surfactant ("Surflon 5-242", manufactured by AGC Seimi Chemical Co., Ltd.) aqueous solution was added to the mixture, followed by mixing to obtain a coating liquid I.

Next, coating liquid I obtained was applied onto the surface of a PTFE porous membrane ("POREFLON HP-010-50", manufactured by Sumitomo Electric Fine Polymer, Inc., thickness: 50 µm, pore size: 0.1 µm) as a porous membrane corresponding to first porous layer 21 on which a third porous layer (PPS non-woven fabric; "PS0080" manufactured by Hirose paper Mfg Co., Ltd., thickness: 180 µm) was laminated in advance, and then the layer of coating liquid I was covered with a porous membrane (PTFE porous membrane; "POREFLON HP-010-50", manufactured by Sumitomo Electric Fine Polymer, Inc., thickness: 50 µm, pore size: 0.1 µm) corresponding to a first layer of a second porous layer. The coated film after application was dried at a temperature of about 120° C. for about 15 minutes.

Next, a porous membrane ("PS0080S", manufactured by Hirose paper Mfg Co., Ltd., thickness: 100 μm) as a second layer of the second porous layer was laminated on the first layer of the second porous layer. Thereby, gas separation membrane 2 including hydrophilic resin composition layer 20 was produced.

The above-mentioned amount to be charged was a unit amount, and scaled up to the size for hydrophilic resin composition layer 20 required in order to produce a gas separation membrane element.

(2) Production of Flow Channel Member Forming Feed-Side Gas Flow Channel, Flow Channel Member Including First Cover In order to prepare flow channel member 3 forming a feed-side gas flow channel, a long SUS net ("SUS50-8", manufactured by DIO CHEMICALS, LTD.; 50×50 mesh; width: 400 mm; thickness: 203 μm) was cut to a predetermined length of 815 mm.

As a film constituting first cover 10, a polyimide film ("SC-6000", manufactured by Custom Adhesive Products, LLC, thickness: about 25 μm) was prepared.

This polyimide film was disposed so as to enclose one end portion of flow channel member 3 forming a feed-side gas flow channel as shown in FIGS. 4 and 5, and fixed to flow channel member 3 forming a feed-side gas flow channel using a double-sided tape ("597B", manufactured by Nitto Denko Corporation) to produce flow channel member 3 forming a feed-side gas flow channel, flow channel member 3 including first cover 10. The polyimide film covered the whole end face of the end portion. The length (length L in FIG. 5) of the film disposed on each of one and the other of main surfaces of flow channel member 3 forming a feed-side gas flow channel was set to 50 mm (3) Preparation of Separation Membrane-Flow Channel Member Composite Body Gas separation membrane 2 obtained in the above (1) was folded in two with the side of the second layer of the second porous layer being on the inner side, and flow channel member 3 forming a feed-side gas flow channel, flow channel member 3 including first cover 10, obtained in the above (2) was inserted into an opening facing turn-back part 12 of the folded gas separation membrane 2 from the side of the end portion including first cover 10, whereby separation membrane-flow channel member composite body 50 was produced. In separation membrane-flow channel member composite body 50 obtained, the end portion of flow channel member 3 forming a feed-side gas flow channel, the end portion being located closest to turn-back part 12 of gas separation membrane 2, is an end portion including first cover 10.

(4) Preparation of Gas Separation Membrane Element

The following members were prepared.

Flow Channel Member Forming a Permeate-Side Gas Flow Channel:

Three PPS net layers (50×50 mesh/60×40 mesh/50×50 mesh) (manufactured by DIO CHEMICALS, LTD.; "50-150 PPS" and "60(40)-150 PPS")

Central Tube:

A central tube having an outer diameter of 1 inch and made of stainless steel, in which a total of 20 perforations each having a diameter of 3 mm are formed in the outer periphery of the central tube. The perforations are formed in two rows in a direction parallel to the axis of the central tube, and 10 perforations are formed per row at a pitch of 25.4 mm so as to form a uniform spacing over a range in a direction parallel to the axis of the central tube around which the laminate is wound. Two rows are provided at opposing positions across the axis of the central tube.

Gas separation membrane element 1 was produced using the above-mentioned members and separation membrane-flow channel member composite body 50 obtained in the above (3) according to the description of <Method for manufacturing spiral-wound gas separation membrane element>. Specifically, the method is as follows.

As shown in FIGS. 7(a) and 7(b), one end of a first-layer of flow channel member 4 forming a permeate-side gas flow channel was fixed to central tube 5 using a two-pack mixing epoxy-based adhesive ("2310", manufactured by Aremco Products Inc.). On one surface of separation membrane-flow channel member composite body 50 obtained in the above (3), the same adhesive as above was applied in a belt-like form along both end portions in the direction parallel to the axis of central tube 5 and along the end portion on the side far from central tube 5 among end portions located at both end in the direction orthogonal to the axis of central tube 5. A first-layer of separation membrane-flow channel member composite body 50 was laminated on the first-layer of flow channel member 4 forming a permeate-side gas flow channel so that the surface on which the adhesive was applied opposite to flow channel member 4 forming a permeate-side gas flow channel Separation membrane-flow channel member composite body 50 was laminated to be spaced away from central tube 5 as shown in FIG. 7(a).

Subsequently, an adhesive was applied in a belt-like form to the exposed surface of the first-layer of separation membrane-flow channel member composite body 50 in the same manner as above, and then a second-layer of flow channel member 4 forming a permeate-side gas flow channel was laminated thereon.

In the same manner as with the first-layer of separation membrane-flow channel member composite body 50, a second-layer of separation membrane-flow channel member composite body 50 was laminated on the second-layer of flow channel member 4 forming a permeate-side gas flow channel. At this time, as shown in FIG. 7(a), the lamination position of the second-layer of separation membrane-flow channel member composite body 50 was more spaced away from central tube 5 than the second-layer of flow channel member 4 forming a permeate-side gas flow channel.

Subsequently, the same adhesive as above was applied to both end portions in the direction parallel to the axis of central tube 5 where separation membrane-flow channel member composite body 50 was not laminated and an end portion on the side far from central tube 5 among end portions located at both ends in the direction orthogonal to the axis of central tube 5 in each flow channel member 4 forming a permeate-side gas flow channel included in laminated body 7. The adhesive was also applied to both end portions in the direction parallel to the axis of central tube 5 in separation membrane-flow channel member composite body 50 on the uppermost surface. Laminated body 7 was wound around central tube 5 to obtain a wound body, and a heat-resistant tape as an outer peripheral tape was wound around the outer periphery of the wound body. Subsequently, both end portions of the wound body in the direction parallel to the axis of the wound body were cut, and an anti-telescope device was attached in contact with the cut surface of each end portion. Then, on the outermost periphery of the wound body, an outer wrap (reinforcing layer) was formed using a fiber-reinforced resin formed of glass fibers impregnated with an epoxy resin ("2300", manufactured by Aremco Products Inc.), thereby forming gas separation membrane element 1. Gas separation membrane element 1 obtained had a length of 15 inches (381 mm).

A total of ten gas separation membrane elements 1 were produced according to the above procedure.

Ten gas separation membrane elements 1 were subjected to the above gas leakage test. As a result, in each of ten gas separation membrane elements 1, the permeance of $N_2$ was less than or equal to $1.0 \times 10^{-7}$ mol/(m² s kPa), and the average value of ten permeances was $0.20 \times 10^{-7}$ mol/(m² s kPa).

Example 2

A total of ten gas separation membrane elements 1 were produced in the same manner as in Example 1 except that a separation membrane-flow channel member composite body 50 including penetration region 9 and second cover 11 was used as separation membrane-flow channel member composite body 50.

Specifically, first, in accordance with the method described in (3) of Example 1, flow channel member 3 forming a feed-side gas flow channel, flow channel member 3 including first cover 10, was produced.

Next, a surfactant ("Surflon S-242", manufactured by AGC Seimi Chemical Co., Ltd.) was applied in advance to the outer side of turn-back part 12 of gas separation membrane 2, and a two-pack mixing epoxy-based adhesive ("2310", manufactured by Aremco Products Inc.) was then applied. Then, a polyimide film ("PIT 0.5S" manufactured by LINQTAPE, thickness: about 38 μm) as second cover 11 was laminated on penetration region 9 so that at least whole penetration region 9 was covered. By thermally-curing the epoxy-based adhesive, penetration region 9 containing a cured material of the epoxy-based resin was formed. Penetration region 9 included a region in which turn-back part 12 had the largest curvature, and the width of penetration region 9 (referring to FIG. 6, the length of an outer arc defining a region representing penetration region 9) was about 50 mm.

As described above, separation membrane-flow channel member composite body 50 including penetration region 9 and second cover 11 was produced. Then, a total of ten gas separation membrane elements 1 were produced in the same manner as in Example 1 except that this separation membrane-flow channel member composite body 50 was used.

Ten gas separation membrane elements 1 were subjected to the above gas leakage test. As a result, in each of ten gas separation membrane elements 1, the permeance of $N_2$ was less than or equal to $1.0 \times 10^{-7}$ mol/(m² s kPa), and the average value of the ten permeances was $0.07 \times 10^{-7}$ mol/(m² s kPa).

Example 3

A total of ten gas separation membrane elements 1 were produced in the same manner as in Example 1 except that a PPS net ("50-150 PPS", manufactured by DIO CHEMICALS, LTD.; 50×50 mesh; thickness: 203 μm) was used as flow channel member 3 forming a feed-side gas flow channel constituting flow channel member 3 forming a feed-side gas flow channel, flow channel member 3 including first cover 10.

Ten gas separation membrane elements 1 were subjected to the above gas leakage test. As a result, in each of ten gas separation membrane elements 1, the permeance of $N_2$ was less than or equal to $1.0 \times 10^{-7}$ mol/(m² s kPa), and the average value of the ten permeances was $0.14 \times 10^{-7}$ mol/(m² s kPa).

Example 4

A total of ten gas separation membrane elements 1 were produced in the same manner as in Example 2 except that a PPS net ("50-150 PPS", manufactured by DIO CHEMICALS, LTD.; 50×50 mesh; thickness: 203 μm) was used as flow channel member 3 forming a feed-side gas flow channel constituting flow channel member 3 forming a feed-side gas flow channel, flow channel member 3 including first cover 10.

Ten gas separation membrane elements 1 were subjected to the above gas leakage test. As a result, in each of ten gas separation membrane elements 1, the permeance of $N_2$ was less than or equal to $1.0 \times 10^{-7}$ mol/(m² s kPa), and the average value of the ten permeances was $0.05 \times 10^{-7}$ mol/(m² s kPa).

Comparative Example 1

A total of ten gas separation membrane elements 1 were produced in the same manner as in Example 1 except that first cover 10 was not provided on flow channel member 3 forming a feed-side gas flow channel.

Ten gas separation membrane elements 1 were subjected to the above gas leakage test. As a result, in eight gas separation membrane elements 1, the permeance of $N_2$ was greater than $1.0 \times 10^{-7}$ mol/(m² s kPa), and the average value of the ten permeances was $1.50 \times 10^{-7}$ mol/(m² s kPa).

Comparative Example 2

A total of ten gas separation membrane elements 1 were produced in the same manner as in Example 3 except that first cover 10 was not provided on flow channel member 3 forming a feed-side gas flow channel.

Ten gas separation membrane elements 1 were subjected to the above gas leakage test. As a result, in five gas separation membrane elements 1, the permeance of $N_2$ was greater than $1.0 \times 10^{-7}$ mol/(m² s kPa), and the average value of the ten permeances was $1.00 \times 10^{-7}$ mol/(m² s kPa).

REFERENCE SIGNS LIST

1: spiral-wound gas separation membrane element (gas separation membrane element), 2: gas separation membrane, 3: flow channel member forming feed-side gas flow channel, 4: flow channel member forming permeate-side gas flow channel, 5: central tube, 7: laminated body, 9: penetration region, 10: first cover, 11: second cover, 12: turn-back part, 15': housing, 20: hydrophilic resin composition layer, 21: first porous layer, 25: bonded portion, 30: perforation, 31: feed-side end portion, 32: discharge port, 33: discharge-side end portion, 35: pressure gauge, 50: separation membrane-flow channel member composite body, N: test apparatus

The invention claimed is:

1. A spiral-wound gas separation membrane element comprising a perforated central tube and a laminated body wound around the central tube, wherein
the laminated body includes a separation membrane-flow channel member composite body,
the separation membrane-flow channel member composite body includes
a gas separation membrane, and
a flow channel member that forms a gas flow channel, the gas separation membrane includes
a hydrophilic resin composition layer having a first surface and a second surface opposite the first surface,
a first porous layer disposed on the first surface of the hydrophilic resin composition layer, and
a second porous layer disposed on the second surface of the hydrophilic resin composition layer,
the flow channel member
has four end portions, and
is provided with a first cover including a film, wherein the film is disposed to cover one end portion of the four end portions, and the film is of a resin material with a thickness of 2 μm to 150 μm,
the gas separation membrane is folded with the first porous layer being located outside the hydrophilic resin composition layer,
the flow channel member is sandwiched in the folded gas separation membrane, and
the first cover is located closest to a turn-back part of the folded gas separation membrane.

2. The spiral-wound gas separation membrane element according to claim 1, wherein
the flow channel member includes a layer formed of a non-woven fabric, a woven fabric, or a net including at least one material selected from the group consisting of resin, metal, and glass.

3. The spiral-wound gas separation membrane element according to claim 1, wherein
the gas separation membrane includes a penetration region into which a resin or a cured material of a resin is penetrated and which is disposed on an outer side of the turn-back part.

4. The spiral-wound gas separation membrane element according to claim 3, wherein
the penetration region includes a cured material of an epoxy-based resin.

5. The spiral-wound gas separation membrane element according to claim 3, wherein
the gas separation membrane further includes a second cover disposed on the penetration region.

6. The spiral-wound gas separation membrane element according to claim 5, wherein
the second cover includes a film disposed to cover the penetration region.

7. The spiral-wound gas separation membrane element according to claim 1, wherein
the hydrophilic resin composition layer includes a hydrophilic resin and an acid gas carrier capable of reversibly reacting with an acid gas.

8. A gas separation membrane module comprising, in a housing, at least one spiral-wound gas separation membrane element as recited in claim 1.

9. A gas separation apparatus comprising at least one gas separation membrane module as recited in claim 8.

10. A separation membrane-flow channel member composite body comprising a gas separation membrane, and a flow channel member that forms a gas flow channel, wherein
the gas separation membrane includes
a hydrophilic resin composition layer having a first surface and a second surface opposite the first surface,
a first porous layer disposed on the first surface of the hydrophilic resin composition layer, and
a second porous layer disposed on the second surface of the hydrophilic resin composition layer,
the flow channel member
has four end portions, and
is provided with a first cover including a film, wherein the film is disposed to cover one end portion of the four end portions, and the film is of a resin material with a thickness of 2 μm to 150 μm,
the flow channel member is sandwiched in the gas separation membrane which is folded, and
the first cover is located closest to a turn-back part of the folded gas separation membrane.

11. A method for manufacturing a spiral-wound gas separation membrane element comprising a perforated central tube and a laminated body wound around the central tube, wherein
the laminated body includes a separation membrane-flow channel member composite body,
the separation membrane-flow channel member composite body includes
a gas separation membrane, and
a flow channel member that forms a gas flow channel,
the gas separation membrane includes
a hydrophilic resin composition layer having a first surface and a second surface opposite the first surface,
a first porous layer disposed on the first surface of the hydrophilic resin composition layer, and
a second porous layer disposed on the second surface of the hydrophilic resin composition layer,
the flow channel member
has four end portions, and
is provided with a first cover including a film, wherein the film is disposed to cover one end portion of the four end portions, and the film is of a resin material with a thickness of 2 μm to 150 μm,
the gas separation membrane is folded with the first porous layer being located outside the hydrophilic resin composition layer,
the flow channel member is sandwiched in the folded gas separation membrane, and
the first cover is located closest to a turn-back part of the folded gas separation membrane, and wherein
the method comprises:
a step of providing the first cover on the flow channel member; and
a step of producing the separation membrane-flow channel member composite body by disposing the first cover of the flow channel member closest to the turn-back part.

12. The method according to claim 11, wherein
the gas separation membrane further includes a penetration region into which a resin or a cured material of a resin is penetrated and which is disposed on an outer side of the turn-back part, and
the method further includes a step of forming the penetration region.

13. The method according to claim 12, wherein
the method further includes a step of providing a second cover on the penetration region.

* * * * *